US010501561B2

(12) United States Patent
Berbee et al.

(10) Patent No.: US 10,501,561 B2
(45) Date of Patent: Dec. 10, 2019

(54) HIGH PRESSURE FREE RADICAL POLYMERIZATION PROCESS WITH FLEXIBLE CONTROL OF MOLECULAR WEIGHT DISTRIBUTION

(71) Applicant: Dow Global Technologies LLC, Midland, MI (US)

(72) Inventors: Otto J. Berbee, Hulst (NL); Cornelis J F Hosman, Ijzendikje (NL); Sergio E. Goncalves, Guaruja (BR); Stefan Hinrichs, Wondelgem (BE)

(73) Assignee: Dow Global Technologies LLC, Midland, MI (US)

( * ) Notice: Subject to any disclaimer, the term of this patent is extended or adjusted under 35 U.S.C. 154(b) by 101 days.

(21) Appl. No.: 15/738,064

(22) PCT Filed: Jun. 24, 2016

(86) PCT No.: PCT/US2016/039186
§ 371 (c)(1),
(2) Date: Dec. 19, 2017

(87) PCT Pub. No.: WO2016/210235
PCT Pub. Date: Dec. 29, 2016

(65) Prior Publication Data
US 2018/0155457 A1 Jun. 7, 2018

Related U.S. Application Data
(60) Provisional application No. 62/184,451, filed on Jun. 25, 2015.

(51) Int. Cl.
*C08F 2/34* (2006.01)
*C08F 2/38* (2006.01)
(Continued)

(52) U.S. Cl.
CPC ............. *C08F 2/34* (2013.01); *A46B 11/06* (2013.01); *B01J 12/00* (2013.01);
(Continued)

(58) Field of Classification Search
USPC ...................................... 526/64, 87
See application file for complete search history.

(56) References Cited

U.S. PATENT DOCUMENTS 3,334,081 A 8/1967 Madgwick et al.
3,350,372 A * 10/1967 Anspon .................. C08F 8/00
525/227

(Continued)

FOREIGN PATENT DOCUMENTS

DE 276598 A3 3/1990
WO 97/45465 A1 12/1997

OTHER PUBLICATIONS

English language translation of full text of DD 276598A3; publication date: Mar. 1990 (Year: 1990).*

(Continued)

Primary Examiner — Fred M Teskin
(74) Attorney, Agent, or Firm — Quarles & Brady LLP

(57) ABSTRACT

Ethylene-based polymer, LDPE, is made in a high pressure polymerization process to comprising at least the step of polymerizing a reaction mixture comprising ethylene, using a reactor configuration comprising (A) at least two reaction zones, a first reaction zone (reaction zone 1) and an i reaction zone (reaction zone i where i>2), (B) at least two ethylene feed streams, each feed stream comprising a percentage of the total make-up ethylene fed to the polymerization process, in which a first ethylene feed stream is sent to reaction zone 1 and a second ethylene feed stream is sent to reaction zone i, and (C) a control system to control the percentage of the total make-up ethylene in the ethylene feed stream sent
(Continued)

Inventive Process Flow Diagram of flexible control of make-up (fresh) ethylene distribution to reaction zone 1 and the percentage of the total make-up ethylene in the ethylene feed stream sent to reaction zone i.

10 Claims, 8 Drawing Sheets

(51) Int. Cl.
*B01J 12/00* (2006.01)
*C08F 2/01* (2006.01)
*B05C 17/005* (2006.01)
*C08F 2/00* (2006.01)
*C08F 210/02* (2006.01)
*A46B 11/06* (2006.01)

(52) U.S. Cl.
CPC .. *B05C 17/00503* (2013.01); *B05C 17/00569* (2013.01); *B05C 17/00573* (2013.01); *C08F 2/00* (2013.01); *C08F 2/01* (2013.01); *C08F 210/02* (2013.01); *Y02P 20/582* (2015.11)

(56) References Cited

U.S. PATENT DOCUMENTS

| | | | |
|---|---|---|---|
| 3,654,253 | A | 4/1972 | Steigerwald et al. |
| 3,917,577 | A | 11/1975 | Trieschmann et al. |
| 4,916,255 | A | 4/1990 | Kobayashi et al. |
| 5,539,075 | A | 7/1996 | Gustafsson et al. |
| 6,569,962 | B1 | 5/2003 | Zschoch et al. |
| 7,820,776 | B2 | 10/2010 | Neuteboom et al. |
| 2002/0052455 | A1 | 5/2002 | Hogt et al. |
| 2003/0114607 | A1 | 6/2003 | Donck |
| 2004/0214971 | A1 | 10/2004 | Gonioukh et al. |
| 2008/0242809 | A1 | 10/2008 | Neuteboom et al. |
| 2009/0234082 | A1 | 9/2009 | Neilen et al. |
| 2010/0060244 | A1 | 3/2010 | Kurokawa et al. |
| 2011/0052525 | A1 | 3/2011 | Grunewald et al. |
| 2012/0059469 | A1 | 3/2012 | Myers et al. |
| 2013/0197168 | A1 | 8/2013 | Berbee et al. |
| 2013/0237678 | A1 | 9/2013 | Osby et al. |
| 2013/0295289 | A1 | 11/2013 | Littmann et al. |
| 2013/0333832 | A1 | 12/2013 | Vittorias et al. |
| 2014/0275427 | A1 | 9/2014 | Nummila-Pakarinen et al. |
| 2014/0288257 | A1 | 9/2014 | Zschoch et al. |
| 2014/0316094 | A1 | 10/2014 | Berbee et al. |
| 2014/0316096 | A1 | 10/2014 | Berbee et al. |
| 2015/0031843 | A1 | 1/2015 | Hjertberg et al. |
| 2015/0038655 | A1 | 2/2015 | Magnusson et al. |
| 2015/0073104 | A1 | 3/2015 | Uematsu et al. |
| 2015/0111053 | A1 | 4/2015 | Nummila-Pakarinen et al. |
| 2015/0133616 | A1 | 5/2015 | Sultan et al. |
| 2015/0197590 | A1 | 7/2015 | Osby |
| 2015/0210785 | A1 | 7/2015 | Nummila-Pakarinen et al. |
| 2015/0274856 | A1 | 10/2015 | Berbee et al. |
| 2015/0344599 | A1 | 12/2015 | Osby et al. |
| 2016/0115256 | A1 | 4/2016 | Berbee et al. |
| 2016/0137822 | A1 | 5/2016 | Den Doelder et al. |
| 2017/0166668 | A1 | 6/2017 | Duchateau et al. |

OTHER PUBLICATIONS

Goto, Journal of Applied Polymer Science, Applied Polymer Symposium, vol. 36, Jan. 1, 1981, pp. 21-40.

* cited by examiner

Comparative Process Flow Diagram of Comparative high pressure polymerization

Comparative Process Flow sheet with all make-up (fresh) ethylene feed to the front (reaction zone 1)

Comparative Process Flow sheet with all make-up (fresh) ethylene feed to the side of the reactor Comparative extreme where all make-up (fresh) ethylene side feed and all CTA front feed Comparative extreme of all make-up (fresh) ethylene front feed and all CTA side feed Comparative Process Flow sheet of high pressure recycle flow distribution to the reactor Inventive Process Flow Diagram of flexible control of make-up (fresh) ethylene distribution

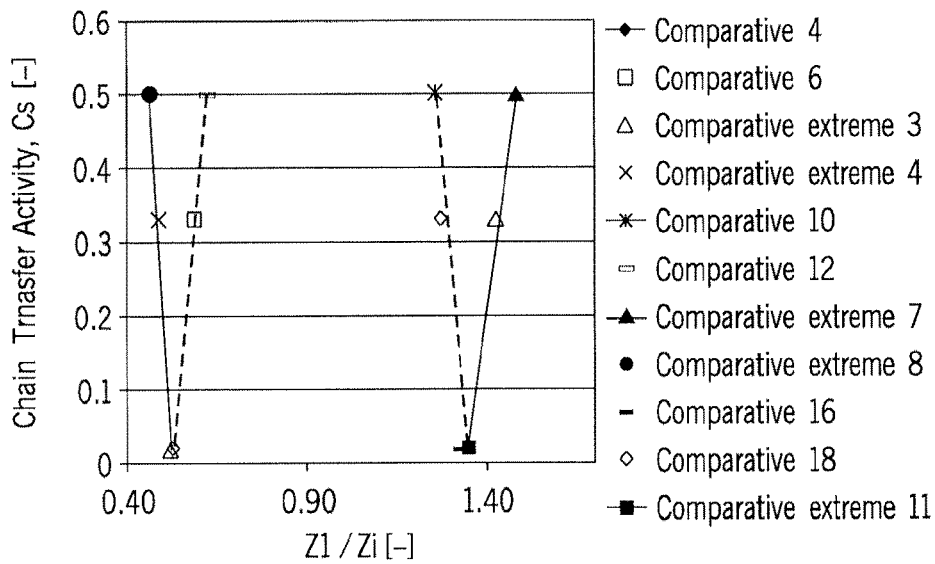

Influence of CTA value on Z1/Zi ratios for high pressure polymerizations with maximum distributions of make-up ethylene and/or make up CTA. Reactor configuration used is 40/60/0. Dashed line is 5 for make-up ethylene distributions only (make-up CTA pro ratio distributed over ethylene feed streams). Solid lines show extreme distributions of make-up ethylene and makeup CTA. The control of Z1/Zi ratios inbetween is inventive.

FIG. 8

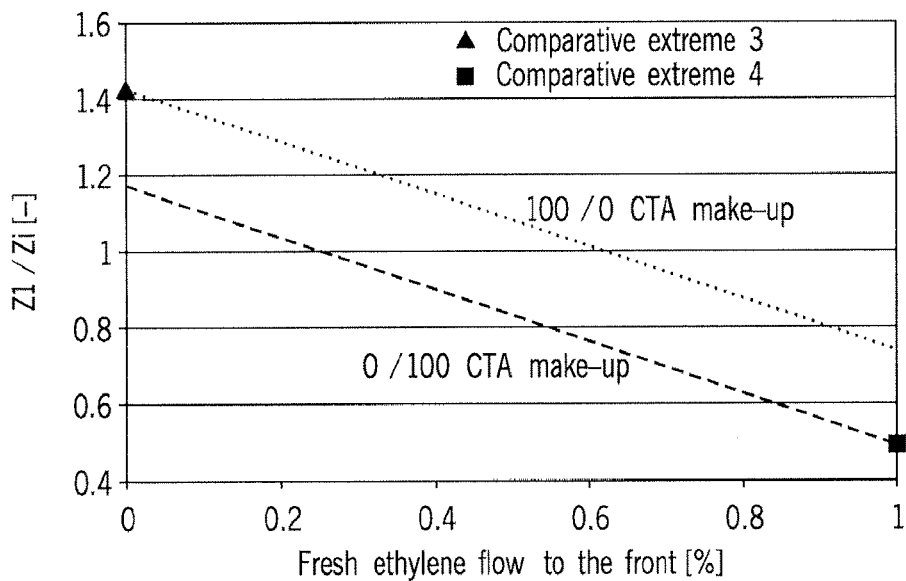

the inventive operation space in Z1/Zi ratios, while applying varying distributions of make-up ethylene and make-up CTA for a 60/40/0 reactor configuration, while applying a CTA with a Cs = 0.33. The possibility to operate in the area of the dash-lines inbetween is inventive.

FIG. 9

Control example of make-up ethylene distribution to the 1st reaction zone as function of changing Flow Coefficient (Cv) in a valve control system.

Another control example of make-up ethylene distribution to the 1st reaction zone as function zone as function of Flow Coefficient (Cv) in a valve control system.

Process Flow Scheme for Comparative extreme 17 (PA front)

Process Flow Scheme for Comparative extreme 18 (PA side)

Conventional GPC MWD distributions for Comparative extreme 17 and 18.

HIGH PRESSURE FREE RADICAL POLYMERIZATION PROCESS WITH FLEXIBLE CONTROL OF MOLECULAR WEIGHT DISTRIBUTION

REFERENCE TO RELATED APPLICATIONS

This application claims the benefit of U.S. Provisional Application No. 62/184,451, filed on Jun. 25, 2015, incorporated herein by reference.

BACKGROUND OF THE INVENTION

Polymers produced by free-radical high pressure technology have wide ranges of applications, for example food packaging, blown and cast film, and extrusion coating. The properties of polymer are designed for the specific applications. For example, polymer materials for film, foam and extrusion coating applications require molecular weight distribution ranging from narrow to very broad, melt strength and/or melt elasticity ranging from low to high, while in film applications good optics have to be maintained. Furthermore polymers (LDPE and high pressure copolymers) produced by the free radical high pressure technology are increasingly used to improve processability of linear low density polyethylene polymers (LLDPE) made by coordination catalysts. Typically LLDPE lacks melt strength due to the low level or absence of long chain branching and is difficult to extrude. By blending in LDPE, processability and line speed in the application can be significantly improved and fabrication can occur at improved economics.

It is well-known that conventional low density polyethylene (LDPE) is produced with high pressure (for example, 160 MPa to 400 MPa) technology, either in autoclave and/or tubular reactors. The initiator systems, known as free-radical agents, are typically injected at multiple points along the reactor, thus creating multiple reaction zone system. The polymerization usually takes place by feeding free-radical initiator system(s) at temperatures in the range from 130° C. to 360° C. In addition, a chain transfer agent (CTA) is used to control the molecular characteristics of the polymer product. It is known that feeding preferentially "make up CTA" to an ethylene inlet (front) feed stream or to a side ethylene feed stream will respectively narrow or broaden the molecular weight distribution (MWD) of the polymer products, see U.S. Pat. No. 3,654,253. Due to the relatively low conversion level/or activity of commonly used CTAs, a significant amount of the CTA fed to the reactor, is recycled back to the polymerization reactor system, wherein CTA is pro rata distributed over all the ethylene feeds towards the reactor. The "make-up CTA" is added to the reactor feed streams to maintain the correct level of CTA in the polymerization, needed to control the product melt-index. The amount of "make up CTA flow," which depends on the CTA conversion level in the reactor and other losses, such as purge, residual CTA in product, and/or condensation in the recycle and compressor sections, typically varies from 1 to 20 percent of the total amount of CTA added to the polymerization. The location of the feed of the "make-up CTA" can be used to vary the concentration ratio of "the concentration of CTA in the front ethylene feed stream" versus "the CTA in the side ethylene feed stream[s]." Moreover, "make-up ethylene" is added to a reactor to compensate converted and lost ethylene (via the purge, etc.). Typically, make-up ethylene is added via the feed streams to the suction (inlet) of the hyper (secondary) compressor system after passing to a booster and/or a primary compressor system. The conventional methods of feeding CTA using the primary and/or booster compressor result in a limited variation of CTA concentration in the reactor feed streams, and these variations are especially limited with CTAs of low activity (for example, see US Publication No. 2003/0114607).

DD 276 598 A3 (English translation) discloses a process for adjusting and regulating the input gas streams for multizone tubular reactors, with at least two side input streams, for the production of ethylene polymers, by free-radical bulk polymerization, and in the presence of 10 to 50 ppm of oxygen, as polymerization initiator. Also disclosed is a two-step venting of the reaction mixture in an intermediate-pressure product separator, and in a low-pressure product separator, and a separation of the polymer, and returning the unreacted reaction gas to the cycle. A chain regulator and make-up ethylene are added to the low pressure return gas. The resulting gas stream is divided into two gas streams, in a ratio of 2:1 to 1:4, and to one of the gas streams is added oxygen, in an amount from 50 to 500 ppm, and the two gas streams are separately compressed to the intermediate pressure. The distribution of oxygen and CTA are linked to each other by which the CTA distribution over the reaction zones cannot be independently controlled and separated from the maximum temperature control in the reaction zones.

US Publication No. 2010/060244 describes a process to make LDPE products by injecting make-up CTA into multiple positions of the reactor in which the ratio of Chain Transfer Agent in the first reaction zone over the $i^{th}$ reaction zone $(Z_1/Z_i)$ is always less than 1. US Publication No. 2011/052525 describes a process to make LDPE products by injecting make-up CTA into multiple positions along downstream of the reactor in which the ratio of Chain Transfer Agent in the first reaction zone over the $i^{th}$ reaction zone $(Z_1/Z_i)$ is always greater than 1. US Publication No. 2012/059469 reports different high pressure polyethylene reactor configurations where ethylene (make-up and a recycle flow from low pressure separator) is lined up to different reaction zones. The publication discloses that different line-ups for various reactor configurations resulting in discrete $Z_1/Z_i$—values.

WO 2012/117039 Publication discloses a process for preparing polyethylene in the presence of free-radical initiator and Chain Transfer Agent (CTA), wherein major part of make-up ethylene is fed to the front of the reactor to maintain the concentration of CTA in the first reaction zone at less than 70% of the highest CTA concentration of other reaction zones. It also discloses zero CTA concentration in the first reaction zone wherein the major part of fully make-up CTA as well as high and low pressure separator flows are recycled to the following reaction zones (or the side of the reactor).

The above cited art to influence MWD by varying the CTA concentration along the reactor results in either limited variation, when this is achieved by distributing the make-up CTA, or in discrete distributions or distributions in discrete narrow ranges when different line-ups of make-up ethylene are used.

The state-of-the-art conventional polymerization processes are very limited in terms of preparing polymer products with a broad range of molecular distributions and a broad range of melt strengths at a given melt index. It is noted that narrow MWD products are typically made at reduced polymerization temperatures and therefore reduced conversion levels which clearly indicates more expensive products. Therefore, it is important to develop new polymerization processes, by which the CTA concentrations in the reactor can be varied widely, and most preferably independent from the activity or conversion level of selected CTA system and which are able to generate ethylene-based polymers at high conversion levels with a wide range of molecular weight distributions (MWDs) and/or a wide range of the melt elasticity and G', at a given melt index. There is a need to produce at the same reactor temperature and pressure conditions broad as well narrow MWD polymers at high conversion levels. Furthermore there is need to control the MWD and melt elasticity of specific polymer resins without modifying reactor conditions like polymerization temperatures and inlet pressure and creating secondary effects on product properties like short chain branching and unsaturation formation. There also a need to develop a control system for controlling the impact of the make-up ethylene distribution and/or distribution of the make-up CTA on polymer properties. These needs are described in below invention.

SUMMARY OF THE INVENTION

In one embodiment the invention is a high pressure polymerization process to form an ethylene-based polymer, the process comprising at least the following step:

polymerizing a reaction mixture comprising ethylene, using a reactor configuration comprising (A) at least two reaction zones, a first reaction zone (reaction zone 1) and an i reaction zone (reaction zone i where i≥2), (B) at least two ethylene feed streams, each feed stream comprising a percentage of the total make-up ethylene fed to the polymerization process, in which a first ethylene feed stream is sent to reaction zone 1 and a second ethylene feed stream is sent to reaction zone i, and (C) a control system to control the percentage of the total make-up ethylene in the ethylene feed stream sent to reaction zone 1 and the percentage of the total make-up ethylene in the ethylene feed stream sent to reaction zone i.

BRIEF DESCRIPTION OF THE DRAWINGS

FIG. 8 is a graph that shows the influence of Cs value on Z1/Zi ratios for high pressure polymerization with maximum make-up ethylene distribution and/or make-up CTA.

FIG. 9 is a graph that shows the inventive operation space in Z1/Zi ratios by application of different distribution of make-up ethylene and make-up CTA.

DESCRIPTION OF EMBODIMENTS OF THE INVENTION

Embodiments

Figure 1:
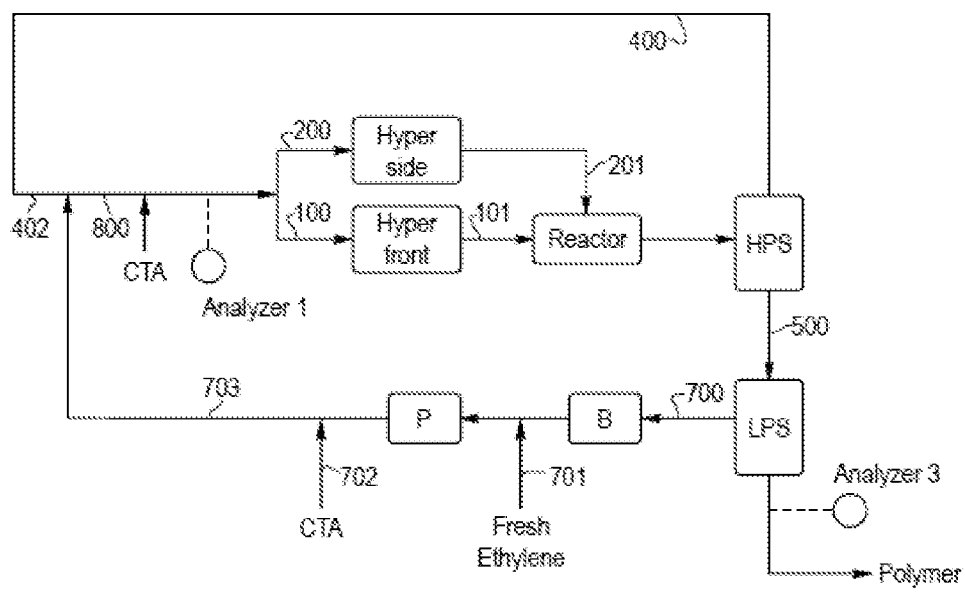
FIG. 1 is process flow diagram of comparative high pressure polymerization.

In one embodiment, the invention provides a process for controlling polymer properties, particularly rheological properties such as melt elasticity, G' and melt strength through CTA distribution while maintaining all other reactor conditions (peak temperatures, start temperature of zone 1 and the inlet pressure. Melt elasticity, melt strength and/or rheological properties are each an indicator of MWD or vice versa are influenced by MWD.

In one embodiment the invention provides a high pressure polymerization process to form an ethylene-based polymer, the process comprising at least the following step:

polymerizing a reaction mixture comprising ethylene, using a reactor configuration comprising (A) at least two reaction zones, a first reaction zone (reaction zone 1) and an i reaction zone (reaction zone i where i≥2), (B) at least two ethylene feed streams, each feed stream comprising a percentage of the total make-up ethylene fed to the high pressure polymerization process, in which a first ethylene feed stream is sent to reaction zone 1 and a second ethylene feed stream is sent to reaction zone i, and (C) a control system to control the percentage of the total make-up ethylene in the ethylene feed stream sent to reaction zone 1 and the percentage of the total make-up ethylene in the ethylene feed stream(s) sent to reaction zone(s) sequential to reaction zone 1.

An inventive process may comprise a combination of two or more embodiments as described herein.

In one embodiment the reactor configuration comprises at least one tubular reactor.

In one embodiment the reactor configuration comprises at least one autoclave reactor.

In one embodiment the reactor configuration comprises at least one tubular reactor and at least one autoclave reactor.

In one embodiment the reactor configuration does not include an autoclave reactor.

In one embodiment the only reactors in the reactor configuration are tubular reactors.

In one embodiment, the first reaction zone is a tubular reaction zone.

In one embodiment, each reaction zone is a tubular reaction zone.

In one embodiment, the first reaction zone is an autoclave reaction zone.

In one embodiment, i is greater than or equal to 3, or 4, or 5, or 10, or 20, or more.

In one embodiment, the reactor configuration comprises at least one Primary compressor and at least one Booster compressor.

In one embodiment, the process comprises 2, or 3, or 4, or 5, or 6, or more ethylene feed streams.

In one embodiment, the first and second ethylene feed streams each comprise from 1 to 99 weight percent (wt %), or 5 to 95 weight percent wt %, or from 10 to 90 wt %, or from 20 to 80 wt %, or from 30 to 70 wt %, or from 35 to 65 wt %, or from 40 to 60 wt %, or from 45 to 55 wt %, of the total ethylene fed to the process polymerization.

In one embodiment, the control system comprises at least one valve.

In one embodiment, the control system comprises at least two valves.

In one embodiment, the valve is a two-way valve.

In one embodiment, the valve is a three-way valve.

In one embodiment, the valve is a multiple-way valve with at least one inlet and at least two outlets, or at least two inlets and at least two outlets.

In one embodiment, the control system includes at least one analyzer.

In one embodiment, each valve of the control system is connected to at least one analyzer through a feedback loop.

In one embodiment, each line that feeds an ethylene feed stream to a reaction zone includes a valve to control the amount of the feed stream that enters the reaction zone.

In one embodiment, one or more lines feeding an ethylene feed stream to a reaction zone includes a valve to control the distribution of the ethylene feed streams over the reaction zones.

In one embodiment, the make-up ethylene does not contain a chain transfer agent other than one or more residual compounds originating from the ethylene production/fractionation process.

In one embodiment, total amount of make-up (make-up) CTA is only distributed to the first reaction zone.

In one embodiment, total amount of make-up (make-up) CTA is only distributed to the reaction zones other than, i.e., following, reaction zone 1.

In one embodiment, total amount of make-up (make-up) CTA is distributed to all reaction zones.

In one embodiment, the polymerization process operates without "injected" CTA, and with only "impurity" CTA compound(s) from ethylene-rich feed stream(s).

In one embodiment the "impurity" CTA compound(s)" originates from the impurities in the make-up ethylene intake, the dissociation products from applied initiators, the solvent used in applied initiator solutions, the applied lubrication oils and other raw materials used.

In one embodiment, the process comprises only one Primary compressor.

In one embodiment, the ethylene-based polymer is a polyethylene homopolymer.

In one embodiment, the ethylene-based polymer is an ethylene-based interpolymer comprising at least one comonomer.

In one embodiment, each feed to each reaction zone contains the same CTA system.

In a further embodiment the CTA system of each feed contains a single CTA.

In one embodiment, at least one of the feeds to at least one of the reaction zones contains a CTA system that is different from at least one of the CTA system(s) to at least one other reaction zone.

In one embodiment, at least one of the feeds to at least one of the reaction zones contains a CTA system that is different from at least one of the CTA systems to the other reaction zones.

In one embodiment, each CTA is independently selected from an olefin, an aldehyde, a ketone, an alcohol, a saturated hydrocarbon, an ether, a thiol, a phosphine, an acetate, an amino, an amine, an amide, an ester, or an isocyanate.

In one embodiment, the maximum polymerization temperature in each reaction zone is, independently, greater than, or equal to, 100° C., and the inlet pressure in each reaction zone is, independently, greater than, or equal to, 100 MPa.

In one embodiment, each of the polymerization conditions in the reaction zones, independently, comprises a set temperature less than 400° C., and an inlet pressure less than 1000 MPa, or less than 500 MPa.

In one embodiment, the maximum polymerization temperature in each reaction zone is, independently, from 100 to 400° C.

An inventive process may comprise a combination of two or more embodiments as described herein.

The invention also provides an ethylene-based polymer made by an inventive process.

In one embodiment, the ethylene-based polymer is a polyethylene homopolymer. In one embodiment, the ethylene-based polymer is an ethylene-based interpolymer.

In one embodiment, the ethylene-based polymer is WIT.

In one embodiment, the ethylene-based polymer has a density from 0.910 to 0.940 g/cm$^3$.

In one embodiment, the ethylene-based polymer has a melt index from 0.1 to 1000 g/10 min.

In one embodiment, the ethylene-based polymer has a density from 0.910 to 0.940 g/cm$^3$, and a melt index from 0.1 to 1000 g/10 min.

An inventive polymer may comprise a combination of two or more embodiments as described herein.

The invention also provides a composition comprising an inventive ethylene-based polymer.

In one embodiment, the composition further comprises another ethylene-based polymer.

An inventive composition may comprise a combination of two or more embodiments as described herein.

The invention also provides an article comprising at least one component formed an inventive composition. In one embodiment, the article is an extrusion coating resin. In another embodiment, the article is a film. In another embodiment, the article is an insulation material and/or a protection layer around a metal wire. In another embodiment, the article is foam. An inventive article may comprise the combination of two or more embodiments as described herein.

In one embodiment, $Z_1/Z_i$ is controlled to be greater than 1.

In one embodiment, $Z_1/Z_i$ is controlled to be less than 1.

In one embodiment, $Z_1/Z_i$ is controlled to be from 0.2 to 2.0, or from 0.3 to 1.8, or 0.4 to 1.6 or 0.5 to 1.5, Polymerizations For a high pressure, free radical initiated polymerization process, two basic types of reactors are known. The first type is an agitated autoclave vessel with one or more reaction zones (autoclave reactor). The second type is a jacketed tube reactor, which tube has one or more reaction zones (the tubular reactor). The high pressure process of the present invention to produce polyethylene homo or interpolymers (for example copolymers) can be carried out in a tubular and/or autoclave reactor, each having at least two reaction zones. For example, the process can be carried out in one or more tubular reactors (in series or in parallel); one or more tubular reactors and one or more autoclave reactors (in series or in parallel); one or more autoclave reactors (in series or in parallel); and one or more autoclave reactors and one or more tubular reactors (in series or in parallel). In one embodiment, the polymerization is carried out in one or more tubular reactors (in series or in parallel, and preferably in series).

The temperature in each reaction zone of the process is typically from 100 to 400° C., more typically from 120 to 360° C., and even more typically from 140 to 340° C. The pressure at the inlet (pressure can be measured by using a pressure transducer located in the feed line to the inlet) in each reaction zone of the process is typically from 100 to 500 MPa, more typically from 120 to 400 MPa, and even more typically from 150 to 350 MPa. Examples of suitable reactor systems are described in U.S. Publication No. 2003/0114607 and DD276598A3. Commercial, high pressure polymerization processes are typically equipped with recycle systems, in order to maximize the conversion of the incoming ethylene to polymer, and to reduce compression energy. A high pressure recycle typically operates at inlet pressures from 50 to 600 bar, more typically from 120 to 500 bar and even more typically from 200 to 400 bar.

Initiators

The process of the present invention is a free radical polymerization process. Free radical—generating compounds include, but are not limited to, organic peroxides, such as peresters, perketals, peroxy ketones and percarbonates, di-tert-butyl peroxide, cumyl perneodecanoate, and Cert-amyl perpivalate. Other suitable initiators include azodicarboxylic esters, azodicarboxylic dinitriles, and 1,1,2,2-tetramethylethane derivatives. These organic peroxy initiators can be used in conventional amounts from 0.005 to 0.2 weight percent, based on the weight of polymerizable monomers. Peroxides are typically injected as diluted solutions in a suitable solvent, for example, in a hydrocarbon solvent.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. A chain transfer agent is typically a component (for example, an organic molecule) able to transfer a hydrogen atom to a growing polymer molecule containing a radical, by which a radical is formed on the chain transfer agent, which can then initiate a new polymer chain. These agents can be of many different types, from saturated hydrocarbons, or unsaturated hydrocarbons, to aldehydes, ketones, or alcohols. By controlling the concentration of the selected chain transfer agent, one can control the length of polymer chains, and, hence the molecular weight, for example, the number average molecular weight, Mn. The melt flow index (MTI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol.

Comonomers like vinyl acetate, alkyl acrylates, etc., can also show chain transfer activity. Copolymers made with high levels of these comonomers are typically made with low level, or no, additional CTA. The distribution of make-up ethylene and recycle ethylene containing unconverted comonomer, like vinyl acetate, could have a similar effect on MWD, as described herein.

Polymers

In one embodiment, the ethylene-based polymers of this invention have a density from 0.910 to 0.940, more typically from 0.912 to 0.940 and even more typically from 0.915 to 0.935, grams per cubic centimeter (g/cc or g/cm$^3$). In one embodiment, the ethylene-based polymers of this invention have a typical melt index ($I_2$) from 0.1 to 100, more typically from 0.15 to 50, and even more typically from 0.2 to 20, grams per 10 minutes (g/10 min) at 190° C./2.16 kg. In one embodiment, the ethylene-based polymers of this invention have a typical Mw/Mn from 3 to 20, or from 3.5 to 16, or from 4 to 14. In one embodiment, the ethylene-based polymers of this invention have a melt strength from 0.5 to 40, or from 1 to 30 centiNewtons (cN). In one embodiment, the ethylene-based polymers of this invention have two or more of these density, melt index, Mw/Mn and melt strength properties.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene vinyl silane (EVS), ethylene vinyl trimethyl silane (EVTMS), and other copolymers made with "silane-containing" comonomers, copolymers made with dienes (for example, FNB) or polyenes, and ethylene carbon monoxide (ECO). Other comonomers are described in Ehrlich, P.; Mortimer, G. A.; Adv. Polymer Science; Fundamentals of Free-radical Polymerization of Ethylene; Vol. 7, pp. 386-448 (1970).

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The term "high pressure polymerization process," as used herein, refers to a free radical polymerization process carried out at an elevated pressure of at least 1000 bar (100 MPa).

The phrase "total make-up ethylene fed to the polymerization process," as used herein, refers to the mass sum of the make-up ethylene feed(s) fed to the "n" reaction zones, where n is the total number of reaction zones.

The term "make-up ethylene," as used herein, refers to ethylene provided from external source(s) and not from internal recycled ethylene source(s). The make-up ethylene is used to compensate for the ethylene consumed by the polymerization and/or lost through, for example, purge from the process and residual ethylene in polymer. The make-up ethylene is typically produced and supplied with a high purity of 99.8 wt % or more, based on total weight of the make-up ethylene supply. The major impurities are methane and ethane.

The phrase "total amount of ethylene fed to the polymerization process," and like terms as used herein, refers to the mass sum of all reactor ethylene-rich feed streams that consists of ethylene as major component, typically greater than 60 wt %, and typically greater than, or equal to, 90 wt %, and more typically greater than or equal to 96 wt %, based on the total weight of the feed, which includes, in addition to ethylene, non-ethylene components (components other than ethylene), like, for example, methane, ethane, solvent, CTA, optional comonomer(s) and/or peroxide dissociation products.

The term "ethylene-rich feed stream," as used herein, refers to a feed stream comprising a majority amount of ethylene, based on the weight of the feed stream; for example, a make-up containing ethylene feed stream or a recycled ethylene feed stream. Due to the presence of non-ethylene components (for example, methane, ethane, etc.) or the addition, or use, of other components (CTA, peroxide, peroxide decomposition components, solvent, etc.), the ethylene concentration in the make-up and recycled ethylene will be typically, respectively, around 99.8 wt % and around 97 wt %, based on the weight of the feed. In case of low reactivity comonomers, like vinyl acetate, the ethylene concentration can be further reduced, and may go as low as 60 weight percent.

The term "recycled ethylene," as used herein, refers to the ethylene that is removed from the polymer in the high pressure and low pressure separators, and the recycled ethylene comprises ethylene not converted in the reactor. A recycled ethylene feed stream comprises recycled ethylene.

The terms "inlet stream" or "reaction zone inlet stream," as used herein, refer to the total mass flow at the inlet of a reaction zone, and consists of the mass flow transferred from the previous reaction zone plus optional ethylene-rich feed streams.

The terms "side stream" or "side feed stream," as used herein, refer to the ethylene-rich feed stream to sequential reaction zones The term "front inlet feed stream," as used herein, refers to the ethylene-rich feed stream fed to the first reaction zone.

The term "reaction zone inlet feed stream," as used herein, refers to the ethylene-rich feed stream fed to the reaction zone.

The phrase "feed to the $n^{th}$ reaction zone," as used herein, refers to the "total mass flow at the $n^{th}$ reaction zone inlet" minus "the mass flow coming from the $(n-1)^{th}$ reaction zone outlet."

The term "reaction zone," as used herein, refers to a zone within a reactor where a polymerization reaction is initiated or reinitiated by addition of radicals or components which dissociate into, and/or generate, radicals. Typically, the reaction medium is heated and/or cooled by a heat transfer medium flowing through a jacket around the reactor.

The term "first reaction zone," as used herein, refers to the reactor zone where the polymerization is first initiated by the addition of radicals or components which dissociate into, and/or generate, radicals. The first reaction zone ends at the point where there is a new feed of make-up and/or recycled ethylene and/or of radicals and/or components which dissociate into, and/or generate, radicals.

The terms "subsequent reaction zone," or "sequential reaction zone," as used herein, refer to a reactor zone which receives ethylene and polymer from a previous reactor zone, and where radicals or components, which dissociate into, and/or generate, radicals, are added at the inlet of the subsequent (or sequential) reactor zone. The subsequent (or sequential) reaction zone ends at the point where there is a new feed of make-up and/or recycled ethylene and/or of radicals and/or components which dissociate into, and/or generate, radicals; however, the $n^{th}$ reaction zone ends at the position of a pressure control device of the reactor system. The number of subsequent (or sequential) reaction zones is (n−1), where n is the total number of reaction zones.

The term "make-up CTA," as used herein, refers to the feed stream of CTA needed to compensate for the converted and/or lost CTA in the high pressure polymerization process, and is typically needed to control or to change the product melt index.

The terms "chain transfer constant" and "chain transfer activity coefficient (Cs value)" as used herein, refer to the ratio between the "rate of chain transfer" to the "rate of ethylene propagation." See Mortimer references provided in Experimental section.

The terms "chain transfer activity" refers to the sum of molar concentration of each applied CTA component multiplied with its chain transfer activity constant (Cs). The chain transfer activity constant (Cs) is the ratio of reaction rates Ks/Kp, at a reference pressure (1360 atm) and a reference temperature (130° C.).

The booster compressor is a device that compresses the following: a) the low pressure recycle coming from the LPS (low pressure separator), and b) optionally, the recycled compressor packing leaks, each to the pressure level required at the inlet side of the primary compressor. This compression can take place in one or multiple compression stages, and can be combined with intermediate cooling. A booster compressor can consist of single or multiple compressor frames, and can be potentially combined with primary compressor frame(s).

The primary compressor is a device that compresses the following: a) the incoming ethylene make-up, and/or b) the low pressure recycle coming from the booster compressor, and/or c) the recycled compressor packing leaks, each to the pressure level required at the inlet side of the hyper compressor. This compression can take place in one or multiple compression stages, and can be combined with intermediate cooling. The primary compressor can consist of single or multiple compressor frames, and can be potentially combined with booster compressor frame(s).

Hyper compressor, or Secondary compressor, is a device that compresses the following: a) the ethylene coming from the HPR (High Pressure Recycle), and/or h) the primary compressor, each to a pressure level required to feed the reactor at its inlet pressure set point. This compression can take place in one or multiple compression stages, and can be combined with intermediate cooling. The hyper compressor comprises a plunger reciprocating compressor, and can consist of single or multiple compressor frame(s).

The term "separate compression flows," as used herein, refers to ethylene feed flows that are kept separated in two or more flows over the primary and/or hyper compressors. During the compression steps, the ethylene feed flows can be kept separated over the parallel operating compression cylinders, or recombined after each compression step.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or with the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer, and, optionally, may comprise at least one comonomer.

The term "ethylene-based interpolymer" or "ethylene interpolymer" refers to an interpolymer that comprises a majority amount of polymerized ethylene, based on the weight of the interpolymer, and comprises at least one comonomer.

The term "composition," as used herein, includes a mixture of materials which comprise the composition, as well as reaction products and decomposition products formed from the materials of the composition.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer.

The term "inlet pressure of high pressure recycle (HPR)" refers to the pressure level in the high pressure separator (HPS).

The term "Z1" refers the mole ratio of mole CTA over total mole ethylene fed to the first reaction zone.

The term "Zi" refers to the ratio of cumulative mole CTA over cumulative mole ethylene fed to the $i^{th}$ reaction zone.

The term "Z1/Zi" refers to the mole ratio of Z between the first and $i^{th}$ reaction zone.

The term "reactor configuration (or reactor system)," as used herein, refers to the components (devices) used to polymerize and isolate a polymer. Such components/devices include, but are not limited to, one or more reactors, a Secondary compressor, a primary compressor, and a booster compressor.

The term "control system," as used herein, in reference to a polymerization process, refers to an apparatus used to control and/or to adjust the composition and/or flow of a feed to a reaction zone. Examples of a control system include, but are not limited to, one or more valves (each having an inlet and an outlet), and one or more multi-way valves (for example, a three-way or four-way valve).

For example, in one embodiment, a valve-control system controls the flow ratio of one or two or more feed streams, for example, the system controls the distribution of make-up ethylene, or recycle ethylene, or make-up CTA, over two or more feed streams to the reactor. Examples of a valve-control system is a system with two or more lines, each with an independent control valve or a multiple way control valve, distributing an inlet stream over two or more outlet streams.

The term "two port valve" or "two-way valve" refers to a valve with one inlet and one outlet, through which a fluid can flow through in either direction.

The term "multiple-port valve" or "multiple way valve" refers to a valve with at least one inlet and at least one outlet and where the sum of inlets and outlets equals the number of ports on the valve.

In one embodiment, a control system can be used for a close loop control, in which the flow ratio of make-up ethylene and/or the high pressure recycle ethylene is adjusted, to obtain the target MWD or other target product properties. Alternatively, the quality measurement for example, melt strength, melt elasticity or G' from an analyzer can be used by the control system to adjust the composition of the ethylene feeds to the reaction zones.

Alternatively the flow ratio can be controlled manually, for instance depending on product analysis by a product analyzer, for example, typical laboratory apparatus to measure melt elasticity, melt strength, G', optical property, etc. The set point of the flow ratio controller can be adjusted accordingly.

The terms "analyzer", or "on-line analyzer, or "at-line analyzer," as used, in reference to a polymerization process and/or a polymer isolation, refers to a device, incorporated with a reactor configuration, that measures the concentration of a reagent (for example a CTA) and/or a polymer property (for example, melt strength or melt elasticity, or other rheological property). Examples include, but are not limited to, Gas Chromatogram apparatus, Infrared Detector apparatus, and typical laboratory apparatus to measure melt elasticity, melt strength, G', optical property, etc.

Test Methods

Density:
Samples for density measurement are prepared according to ASTM D 1928. Samples are pressed at 190° C. and 30,000 psi for three minutes, and then at (21° C.) and 207 MPa for one minute. Measurements are made within one hour of sample pressing, using ASTM D792, Method B.

Melt Index:
Melt index, or $I_2$, (grams/10 minutes) is measured in accordance with ASTM D 1238, Condition 190° C./2.16 kg. $I_{10}$ is measured with ASTM D 1238, Condition 190° C./10 kg.

Melt Elasticity (ME):
ME is measured using a DMELT system. The DMELT system is comprised of a commercial plastometer, a digital balance incorporating a custom weighted sample. For the melt elasticity measurement a molten polymer strand is extruded from a standard plastometer (MP600 Extrusion Plastomer (Melt Indexer) System Installation & Operation manual (#020011560), Tinius Olsen, 1065 Easton Road, Horsham, Pa., 19044-8009; Ref. No. 13.6) barrel at a constant temperature (190° C.) through a standard ASTM D1238 MFR die (orifice height (8±0.025 mm) and diameter (2.0955±0.005 mm) using a weighted piston. The extrudate is pulled through a series of free spinning rollers onto a roller driven by a stepper motor (Stepper Motor and Controller Operating Manual, Oriental Motor USA Corporation, 2570 W.237$^{th}$ Street, Torrance, Calif. 90505; Ref. No. 13.7) which is ramped over a velocity range during the analysis. The force of the polymer strand pulling up on the balance (Excellence Plus XP Precision Balance Operating Instructions, Mettler Toledo, 1900 Polaris Parkway, Columbus, Ohio 43240; Ref. No. 13.8) platform mounted tension roller is recorded by the integrated control computer. From a linear regression of the acquired force data, the final reported value is determined based on a constant velocity ratio (33.2) or strain (Ln [Speed ratio]=3.5) of the polymer strand speed versus the die exit speed. Analysis results are reported in units of centiNewton (cN).

Rheology (G'):

The rheology measurement to determine G' is done in a nitrogen environment at 170° C. and a strain of 10%. The stamped-out disk is placed between the two "25 mm" parallel plates located in an ARES-1 (Rheometrics SC) rheometer oven, which is preheated for at least 30 minutes at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus (G') and loss modulus (G") of the sample are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1—points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation $Y=C1+C2 \ln(x)$. Using the Orchestrator software, G' at G" equal to 500 Pa is determined by interpolation.

Melt Strength (MS):

MS is a measure of the extensional viscosity of polymer melts, and it represents the maximum tension that can be applied to the melt, without rupture or tearing of the melt. A capillary viscometer is used to extrude a polymer strand, and the strand is pulled by a pair of rollers, until it ruptures. Melt strength (MS) was measured using a GÖETTFERT RHEO-TENS attached to an INSTRON capillary rheometer. The polymer melt was extruded through a capillary, at an aspect ratio (capillary length/capillary radius) of 30, and at a constant plunger velocity. Therefore, the polymer melt was subjected to a constant apparent wall shear rate. The extruded melt was subsequently stretched by a pair of serrated wheels having radii of 19 mm, at a distance (H) from the capillary exit. The rotational speed of the wheels was increased linearly with time, while the draw down force (F) was monitored. The melt strength was reported as the draw down force (cN) measured when the polymer strand broke. The following conditions were used in the melt strength measurement: temperature 220° C., plunger speed 0.2 mm/s, wheel acceleration 6 mm/s$^2$, capillary radius 1 mm, capillary length 30 mm, barrel radius 6 mm, wheel radius 19 mm, and distance (H) 100 mm.

Triple Detector Gel Permeation Chromatography (TDGPC):

High temperature 3Det-GPC analysis was performed on an Alliance GPCV2000 instrument (Waters Corp.) set at 145° C. The flow rate for the GPC was 1 mL/min. The injection volume was 218.5 The column set consists of four Mixed-A columns (20-μm particles; 7.5×300 mm; Polymer Laboratories Ltd).

Detection was achieved by using an IR4 detector from Polymer ChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector was calibrated by measuring the scattering intensity of the TCB solvent. Normalization of the photodiodes was done by injecting SRM 1483, a high density polyethylene with weight-average molecular weight (Mw) of 32,100 and polydispersity of 1.11. A specific refractive index increment (dn/dc) of −0.104 mL/mg, for polyethylene in TCB, was used.

The conventional GPC calibration was done with 20 narrow PS standards (Polymer Laboratories Ltd.) with molecular weights in the range 580-7,500,000 g/mol. The polystyrene standard peak molecular weights were converted to polyethylene molecular weights using the following:

$$M_{polyethylene} = A \times (M_{polystyrene})^B$$

with A≈0.39, B=1. The value of A was determined by using HDPE reference, a linear polyethylene homopolymer with Mw of 115,000 g/mol. The HDPE reference material was also used to calibrate the IR detector and viscometer, by assuming 100% mass recovery and an intrinsic viscosity of 1.873 dL/g. Distilled "Baker Analyzed-grade" 1,2,4-trichlorobenzene (J. T. Baker, Deventer, The Netherlands), containing 200 ppm of 2,6-di-tert-butyl-4-methylphenol (Merck, Hohenbrunn, Germany), was used as the solvent for sample preparation, as well as for the 3Det-GPC experiments. HDPE SRM 1483 was obtained from the U.S. National Institute of Standards and Technology (Gaithersburg, Md., USA). LDPE solutions were prepared by dissolving the samples under gentle stirring for three hours at 160° C. The PS standards were dissolved under the same conditions for 30 minutes. The sample concentration for the 3Det-GPC experiments was 1.5 mg/mL, and the polystyrene concentrations were 0.2 mg/mL.

Experimental Section

Description of Process Flow Diagram

Process Flow Scheme for Comparative Examples 2, 5, 8, 11, 14, 17, 20 and 23—Simulated Distributions of the CTA FIG. 1 illustrates a simply comparative flow diagram of free radical polymerization process in a tubular reactor. Ethylene base-feed streams (stream 100 and 200) are fed to the suction of the hyper compressors to compress the flow to the reactive pressure of 100-300 MPa. The stream 101 is distributed to the 1$^{st}$ reaction zone of the reactor, while the stream 201 is fed to the side of the reactor, in which the flows have equal compositions and levels of make-up (fresh) ethylene fed from the primary compressor. The polymerization reaction takes place in the presence of initiator and chain transfer agents. The outlet flow of the reactor comprising polymer as product and unconverted components (initiators, CTAs, impurities and solvents) goes to the high pressure separator (HPS) in which the unconverted component are recycle back to the hyper while the rest flow mainly comprising polymer enters to the low pressure separator (LPS). In the LPS, polymer product is separated and analyzed by Analyzer 3, while the other stream (700) comprising mostly ethylene which comes to the booster and primary compressor where make-up ethylene and/or alternative CTA make-up are added. The stream (703) is then combined with the high pressure recycle stream in which CTA (stream 702) can be added. In the process flow diagram, purge flows from the HPR (High Pressure Recycle) and LPR (Low Pressure Recycle) are negligible.

Figure 2:
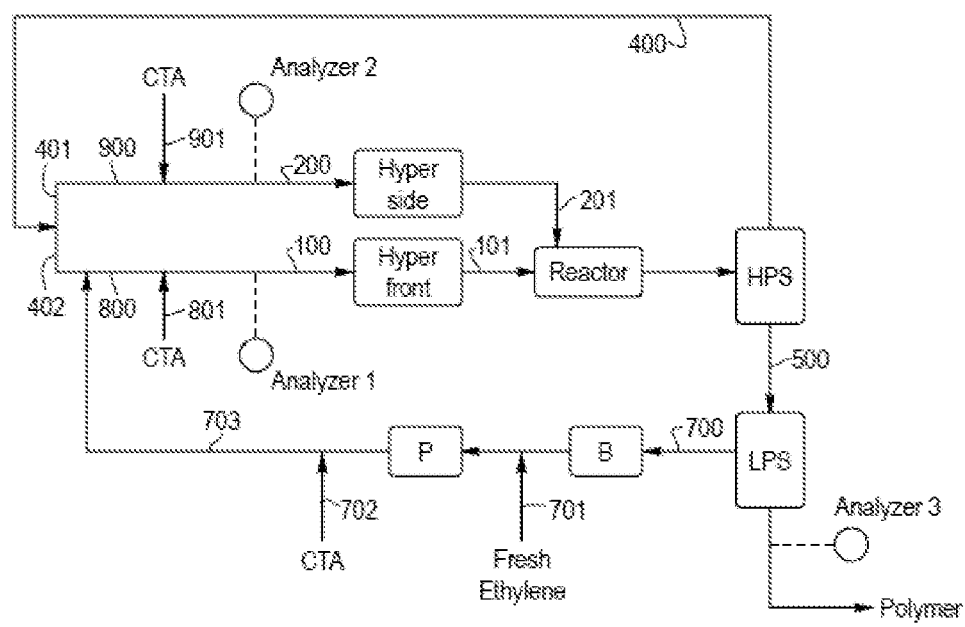
FIG. 2 is a process flow sheet where all make-up ethylene is fed to the front of the reactor (reaction zone 1).

Process Flow Scheme for Comparative Examples 3, 6, 9, 12, 15, 18, 21 and 24—Simulated FIG. 2 shows a comparative scheme similar to the scheme 1 (FIG. 1) except for the make-up (fresh) ethylene (stream 701), which is completely sent to the front of the reactor. Moreover the make-up CTA flows (streams 801 and 901) are fed to the reaction zone 1 (front) and the following reaction zones (side) respectively. Those CTA concentration levels are carefully measured by the two analyzers 1 and 2. Note that the ethylene feed stream could be sent to more than one reaction zone in the side of the reactor (stream 201 and 202) as shown above.

Figure 3:
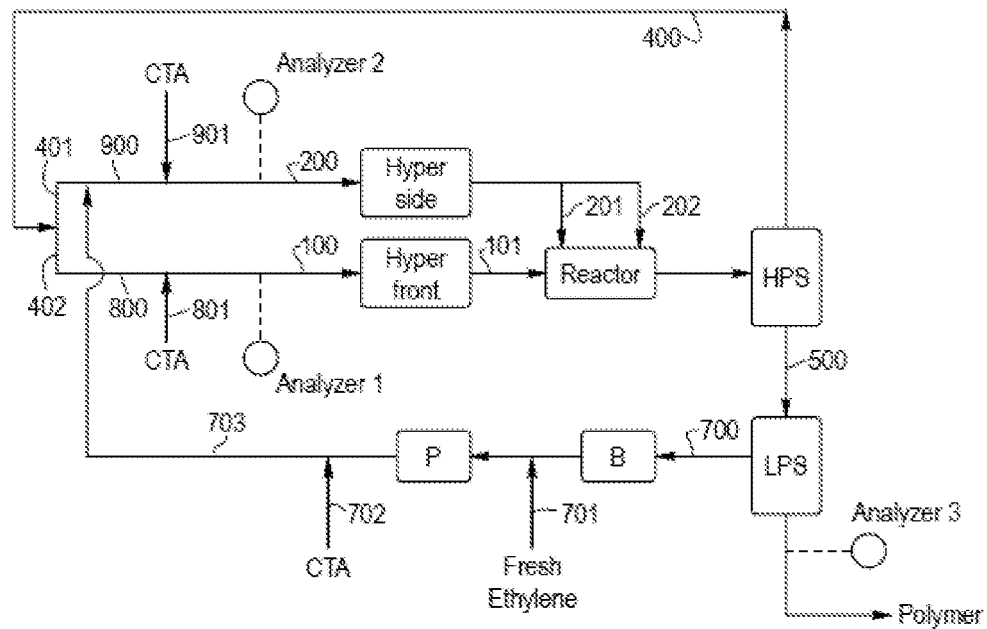
FIG. 3 is a process flow sheet where all make-up ethylene is fed to the side of the reactor (reaction zone i)

Process Flow Scheme for Comparative Examples 1, 4, 7, 10, 13, 16, 19 and 22—Simulated The scheme in FIG. 3 is similar to scheme 2 (FIG. 2) except for the make-up (fresh) ethylene (stream 701) is fed to the side of the reactor.

Figure 4:
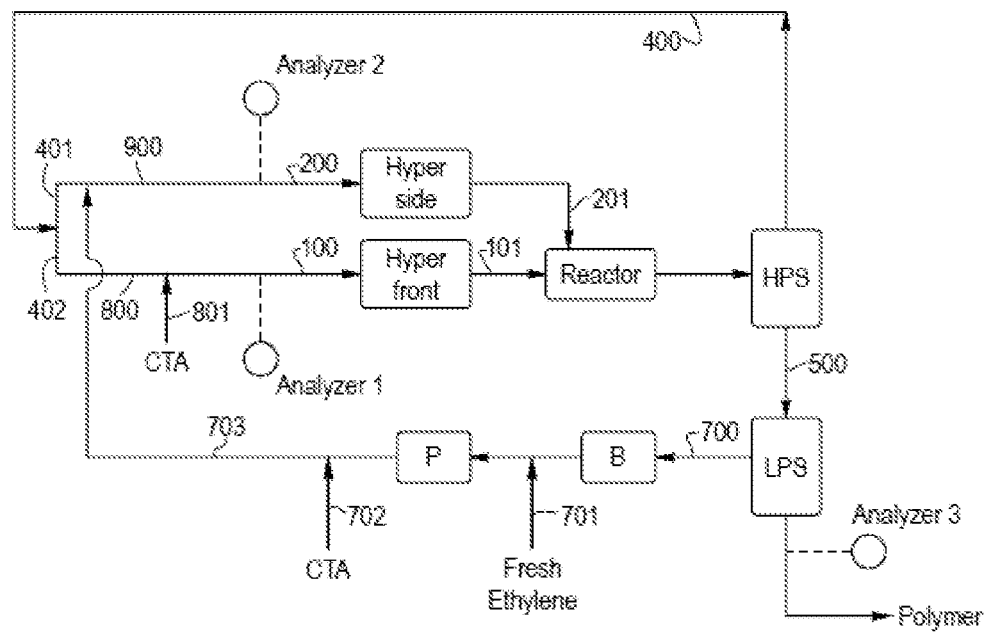
FIG. 4 is a comparative extreme process flow sheet where all make-up ethylene is fed to the side and all CTA is fed to the front.

Process Flow Scheme for Comparative Boundary Examples 1', 3', 5', 7', 9', 11', 13 and 15—Simulated FIG. 4 shows a special option of the FIG. 3 scheme where almost all of make-up ethylene stream (701) sent to the side of the reactor and all make-up CTA sent to the front of the reactor.

Figure 5:
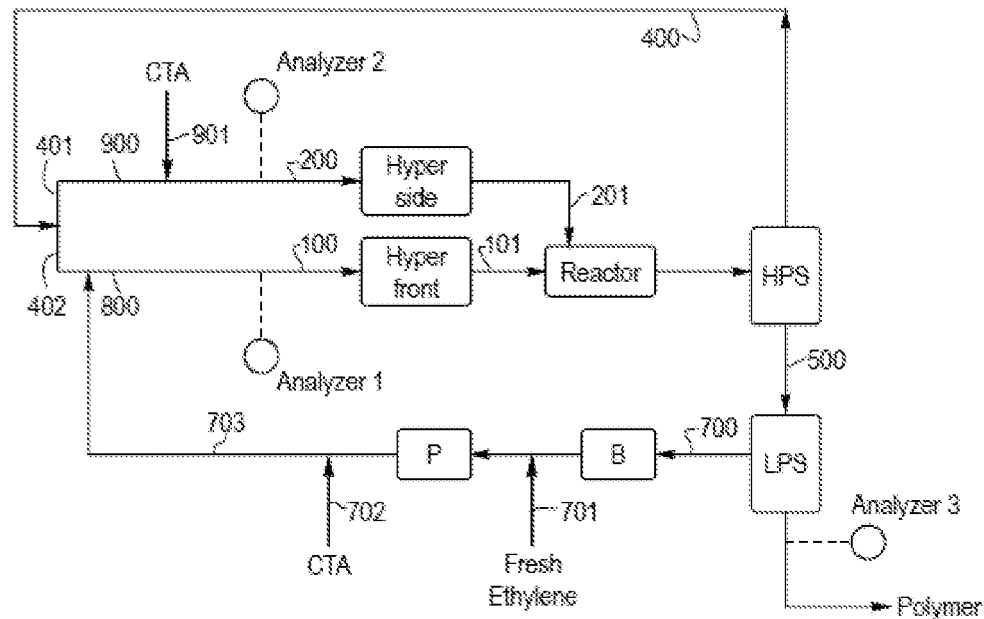
FIG. 5 is a comparative extreme process flow sheet where all make-up ethylene is fed to the front and all CTA is fed to the side.

Process Flow Scheme for Comparative Boundary Examples 2', 4', 6', 8', 10', 12', 14' and 16'—Simulated FIG. 5 is a special operation of the scheme shown in FIG. 2 in which all make-up ethylene flow (701) sent to the front of the reactor and all CTA fed to the side of the reactor.

Figure 6:
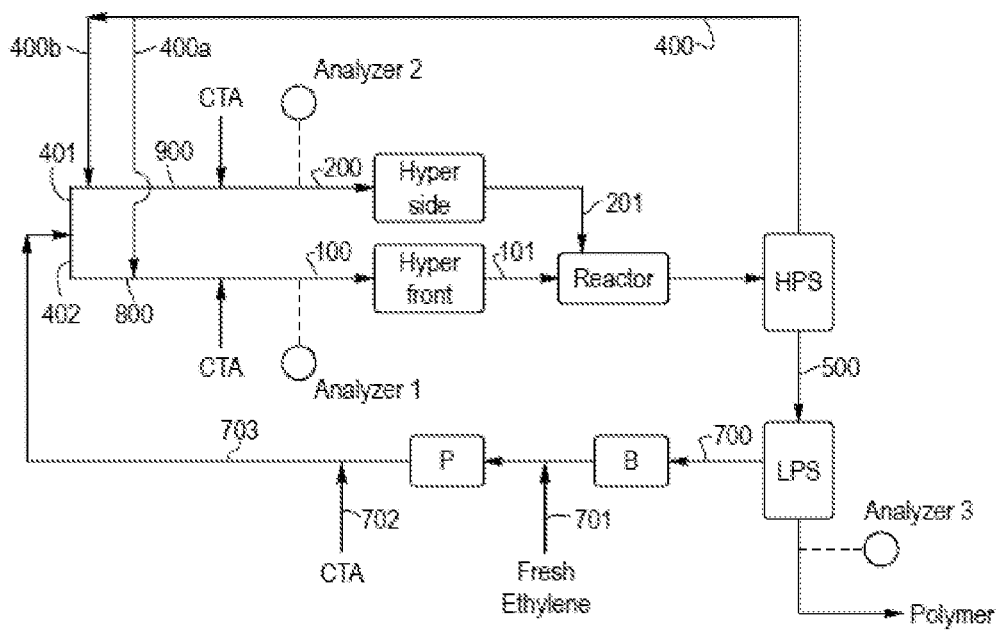
FIG. 6 is a comparative process flow sheet of high pressure recycle flow distribution over the front of the reactor.

Process Flow Scheme for Comparative Examples with Different High Pressure Recycle Stream Distribution Over the Reactor A comparative process flow scheme in which the distributions of high pressure recycle flow over the reactor is shown in FIG. 6. In this scheme, the LIPS flow (stream 400) is combined with the flow from the primary compressor (stream 703) and divided into streams 400a and 400b which subsequently distributed over the reactor. The rest operation is mention above.

Process Flow Scheme for Inventive Examples 1 to 16—Simulated

Figure 7:
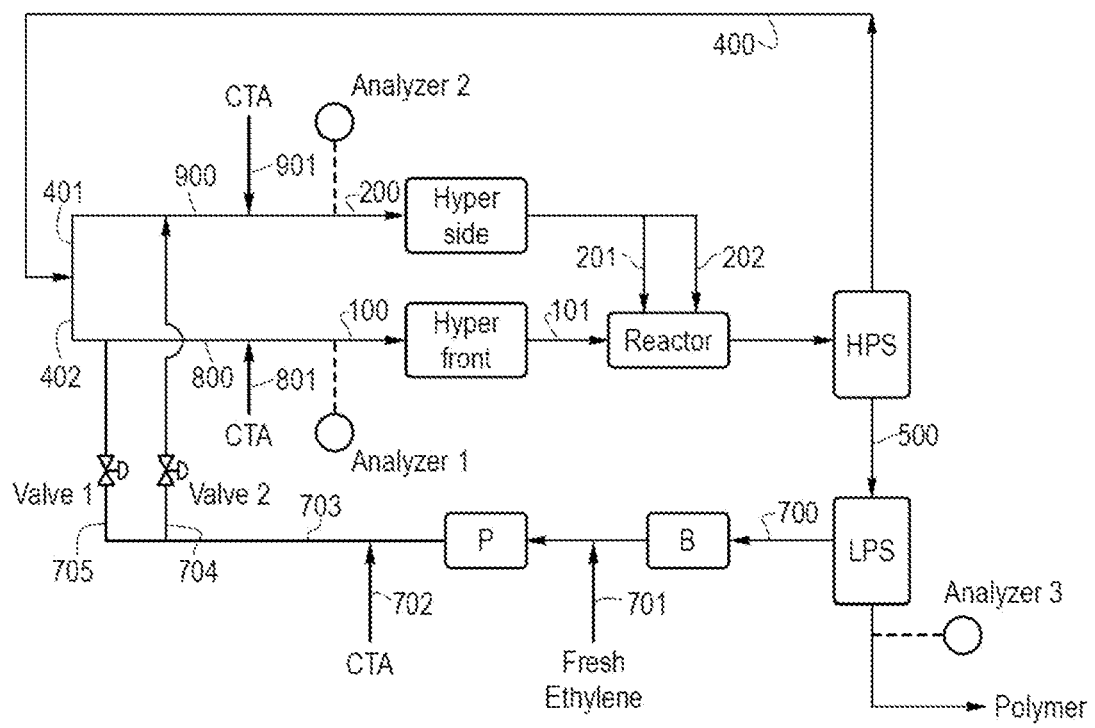
FIG. 7 is an inventive process flow diagram of flexible control of MWDs via make-up ethylene distribution.

FIG. 7 shows a flow scheme of a high pressure polymerization plant configuration containing a tubular reactor invented in this invention. Stream (700) from Low pressure Separator (LPS) has low pressure (around 0.1 MPa), which is fed to the booster compressor and compressed up to around 3 MPa. Make-up ethylene (stream 701) is combined with the outlet stream of the Booster, and compressed up to 10 to 25 MPa via the primary compressor. The outlet stream from the primary compressor (CTA (stream 702) can be added into the stream 703) is then split into stream (704) and stream (705). Valve 1 and Valve 2 are the two controlled valves (streams 705 and 704) and used to control the distribution of the primary compressor output, containing make-up ethylene, over the feed streams to the reaction zones of the reactor.

The High Pressure Compressor (HPS) recycle stream (400) at the pressure around 20-30 MPa is divided into stream (401) and stream (402) of which each of them is lined-up with stream (704) and/or (705). After lining up of the streams (401 with 704) and (402 with 705), the streams (800) and (900) are distributed over the suctions of the two Hypers. The Hypers pressurize the ethylene feed streams to a level sufficient to feed the high pressure tubular reactor (Reactor).

The flow sheet also shows the CTA system make-up (fresh) feed which can, in principle, be freely distributed over the main compression streams fed and/or distributed over the side stream (201) and/or (202) and front stream (101). CTA make-up streams (801) and (901) and/or (702) can be fed in the inlet(s), interstage(s), outlet(s) of the Hyper, and/or inlet(s) of the reaction zones. The CTA system can consist of single and/or multiple components, or can include varying compositions and can also behave as both CTA and comonomer.

The discharge temperature of the Hyper is typically in the range from 60 to 100° C. The ethylene feed to the first reaction zone (stream 100) is typically preheated to a temperature from 130 to 180° C., while the ethylene of the side feed (stream 201 and 202) is fed to the reactor at the Hyper discharge temperature or cooled prior to feeding to the reactor.

In the Reactor, the polymerization is initiated with the help of a free radical initiation system(s) injected, and/or activated, at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled down, and separated in the high pressure separator (HPS). The HPS separates the reaction mixture into an ethylene rich stream (400), containing minor amounts of waxes and/or entrained polymer, and a polymer rich stream (500), which is sent to the LPS for further separation.

The polymer separated in ITS is further processed to final polymer product while the ethylene removed (700) in the LPS is fed to the Booster. The analyzer 1 and analyzer 2 are used to measure the CTA concentration in the suction of the Hyper compressors or the CTA ratio between the first and the following reaction zones ($Z_1/Z_i$) in order to control the opening of Valves 1 and Valve 2. The Analyzer 3 is installed to measure the product properties like density, Melt index, Mel Elasticity, G', rheology and gel performance.

Stepless Control of MWD Via Flexible Control of Make-Up (Fresh) Ethylene Distribution A simple mass balance model has been developed to calculate the composition of the compositions in the whole process flow sheet. In the model, the purge flows in the recycle streams, the condensable flows as well as gland leaks in the hyper compressors are assumed to be negligible. Also the impurities and solvent are considered not to contribute to the effect of CTAs on the MI and $Z_1/Z_i$ ratio. Finally a total ethylene feed stream of 100,000 metric ton per hour have been used as an inlet stream of the reactor.

The ratio between the first reaction zone and a sequential reaction zone i is calculated. Fraction of molar ppm of CTA in the first reaction zone (stream 100):

$$Z_1 = \frac{n_{CTA1}}{n_{eth1}} \times C_{s,CTA} \times 10^6. \qquad (\text{eqn. 1})$$

(i) Mole ppm of CTA in the following reaction zone:

$$Z_i = \frac{\sum_{1}^{n} n_{CTAi} \times C_{s,CTA}}{\sum_{1}^{n} n_{ethi}} \times 10^6, \qquad (\text{eqn. 2})$$

where $n_{CTAi}$: molar flow of CTA injected to reactor zones i, including recycle CTA after converting to polymer and the CTA make-up flow [kmol/hr]; $n_{eth}$: molar flow of ethylene fed to the reactor zones i, including the recycle ethylene after converting to polymer and ethylene make-up flow [kmol/hr]; i: Number of reaction zones where feed ethylene and/or CTA have been distributed; n: Total reaction zones where feed ethylene and/or CTA have been distributed.

Calculation examples are demonstrated for CTA types, but can be applied at CTA systems, containing multiple CTAs, by calculating a weighted Cs factor for the CTA system. Note that in case of a component that works as both CTA and comonomer functionalities, the total CTA consumption is the sum of consumption by chain transfer and acting as comonomer.

Comparative Boundary Examples 1' to 16'—Simulated

The Comparative Boundary Examples 1' and 2' in Table 1 indicate the two extreme cases have been calculated in which no make-up ethylene and all make-up CTA are fed to the $1^{st}$ reaction zone, giving the highest $Z_1/Z_i$ ratio (1.34). All make-up ethylene and no make-up CTA are fed to the $1^{st}$ reaction zones which gives the lowest $Z_1/Z_i$ ratio (0.46).

Those two values of $Z_1/Z_i$ are considered as the two extreme boundaries for the operation, in which extreme distributions of make-up ethylene and make-up CTA are applied. Similar calculations are shown for Comparative Boundary Examples 3' to 16'.

Comparative Examples 1 to 9—Simulated

Comparative Examples 1 to 9 compare the influence of reactor configuration on the $Z_1/Z_i$ as shown in Table 1. It shows that the reactor configuration of 60/40/0 results in extreme $Z_1/Z_i$ ratios of 0.82 and 1.27, corresponding to full (100%) and 0% make-up ethylene fed to the $1^{st}$ reaction zone. Similarly, the reactor configurations using 50/35/15 and 40/60/0 feed distributions give extreme $Z_1/Z_i$ ratios of 0.73-1.27 and 0.59-1.27, respectively. Note that the reactor configuration of 50/35/15 gives different $Z_1/Z_2$ and $Z_1/Z_3$ ratios. The further study is done for the 40/60/0 configuration, and is presented in following sections.

Comparative Examples 4, 6 and 10 to 18 and Comparative Boundary Examples 13' to 16'—Simulated Comparative Examples 4, 6 and 10 to 18 in Table 2 reports the effect of CTA (Cs value) on the $Z_1/Z_i$ as demonstrated in FIG. 8 (dash lines). It is of interest to see that by varying the make-up ethylene distribution to the $1^{st}$ reaction zone, the CTA with higher Cs value generates slightly narrower $Z_1/Z_i$ range of operation. In more detail, the $Z_1/Z_i$ ratio varies between 0.61-1.26, for Cs of 0.5, and between 0.53-1.34, for Cs of 0.02, as can be seen in FIG. 8. However, the effect is reversed for the extreme cases, when the effect of make-up CTA distribution is added (see Comparative Examples 13 to 16). It shows that the higher Cs value significantly enlarges the operational range where almost no additional effect has been found for very low Cs factor. It can be explained based on the difference in reactor conversion level for the different CTA types. CTAs with high Cs value results in higher reactor conversion levels, while CTAs with low Cs values results in low reactor conversion levels. Therefore, compared to the extreme cases (Comparative Examples 10 and 12), the injection of CTA in the Comparative Boundary Examples 7' and 8' play significant impact on the $Z_1/Z_i$ (see Table 2 and FIG. 8 in grey line). Reversibly, the very low Cs value requires much higher amount of CTA indicating a much higher concentration in the feed streams as well as the high pressure recycle stream, which results in combination with low reactor conversion for the CTA is less effective on the comparative extreme cases. As can be observed in FIG. 8, there is no significant difference among Comparative Boundary Examples and Comparative Examples for CTA with Cs of 0.02. It can be concluded that the high Cs values are effective for the production of both very narrow and very broad MWD polymers as well as all other products in between.

Moreover, the effect of both CTA and comonomer on the $Z_1/Z_i$ has been quantified as shown in Comparative Examples 13 to 15 and Comparative Boundary Examples 9' and 10'. However some CTAs will deviate from above observation. CTAs with comonomer activity, like for instance propylene and butane-1, will show despite their low Cs values a higher contribution by the distribution of the make-up CTA and therefore higher extreme $Z_1/Z_i$ ratios. The explanation for their deviating behavior is that their conversion in the reactor is enhanced by their comonomer activity. The conversion level by their comonomer functionality outweighs the conversion level by their CTA functionality. See Comparative Examples 9, 10 and 13 to 15, Inventive Examples 9 and 10, and Comparative Boundary Examples 9' and 10' for calculation results.

The CTA used in Comparative Examples 9, 10 and 13 to 15, Inventive Examples 9 and 10, and Comparative Boundary Examples 9' and 10' has a comonomer activity described by $r_1$ (1.70) and $r_2$ (0.59). Chain transfer activity and comonomer reactivity scheme data are described in the following: P. Ehrlich, G. A. Mortimer, *Fundamentals of the free radical polymerization of ethylene*, Adv. Polymer Sci., Vol 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at* 1360 atm and 130° C.; vol 8, p 1513-1523 (1970); G. Mortimer, Journal of Polymer Science: Part A-1, *Chain transfer in ethylene polymerization. Part V. The effect of temperature*; vol 8, p 1535-1542 (1970); G. Mortimer, Journal of Polymer Science: Part A-1, *Chain transfer in ethylene polymerization Part V. The effect of pressure*, vol 8, p 1543-1548 (1970); and G. Mortimer, Journal of Polymer Science: Part A-1, *Chain transfer in ethylene polymerization VII. Very reactive and depletable transfer agents*, vol 10, pp. 163-168 (1972). Cs measured at 130° C. and 1360 atm.

Comparative Examples 4 to 6 and 19 to 24 and Comparative Boundary Examples 3', 4', and 13' to 16'—Simulated Table 3 compares the influence of ethylene conversion (varying between 20 and 40%) on the $Z_1/Z_i$ factor. The calculations have been done for the reactor configuration of 40/60/0, and using a CTA with the Cs value of 0.33. For the 40% conversion level, it is noted that only around 80% of the make-up ethylene can be fed to the $1^{st}$ reaction zone (See comparative 24 and comparative extreme 16), compared to the cases of 20% and 30% of ethylene conversions, where 100% of the make-up ethylene can be fed to the first reaction zone. It can be explained that the lower ethylene conversion results in higher HPS recycle flow, and thus requires less amount of ethylene make-up to get the total amount of reactor feed. This explains the broader range in $Z_1/Z_i$ values as observed in Table 3.

Inventive Examples 1 to 16—Simulated

The Comparative Examples 1 to 24 and Comparative Boundary Examples 1' to 16' present the boundaries of $Z_1/Z_i$ corresponding the reactor configurations, CTA type (Cs value) and ethylene conversion levels. This invention shows the flexible control of (fresh) make-up ethylene operation between the minimum and maximum limitation. The dash lines show the possible operations where extreme distributions of both make-up ethylene and make-up CTA flows have taken into account, resulting in the boundary areas of the $Z_1/Z_i$ control levels. Note that in this reactor configuration, the highest and lowest $Z_1/Z_i$ corresponding to extremely narrow and extremely broad resins can only be produced under the conditions of Comparative Boundary Examples 3' and 4'. Thus the area, which is limited by both curves, represents the operation ranges and is investigated in this invention in order to control the polymer properties such as MWD, Melt Index, Melt elasticity as well as other rheology properties (see Table 2 and FIG. 8 and FIG. 9 for more detail). Since $Z_1/Z_i$ correlates to Melt Elasticity and Molecular Weight Distribution, which can be stepless controlled by varying the distribution of make-up ethylene (with fixed ratio of CTA distribution), or combining both make-up ethylene distribution and make-up CTA, without adjusting major reactor conditions, like control temperature and pressure.

Control Valve System

The flow from the primary compressor has a pressure between 10-30 MPa, which needs to be measured and/or controlled before feeding/distributing to the hyper compressor system and further distribution to different reaction zones of the reactor system. A valve-control system is proposed to control the flow ratio. Examples of a valve-control system are a system with two or more lines with each an independent control valve or a multiple way control valve distributing an inlet stream over two or more outlet streams.

Figure 10:
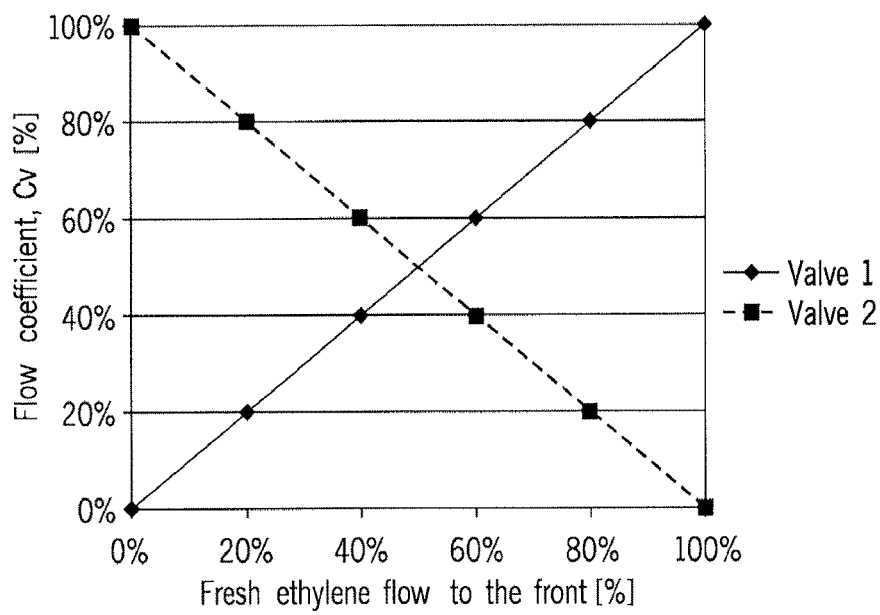
FIG. 10 is a graph that shows the control example of make-up ethylene distribution to the $1^{st}$ reaction zone as a function of flow coefficient in a control valve system.

FIG. 10 shows the relationship between Cv flow coefficient (reflects the degree of opening of the valve system) of the control system and the distribution of make-up (fresh) ethylene fed to the $1^{st}$ reaction zone. Since the total flow going to the reactor of both valves is always constant, the total Cv value kept a constant across the whole range of the two-valve flow rate. However, pressure drop in this system is relatively high.

Figure 11:
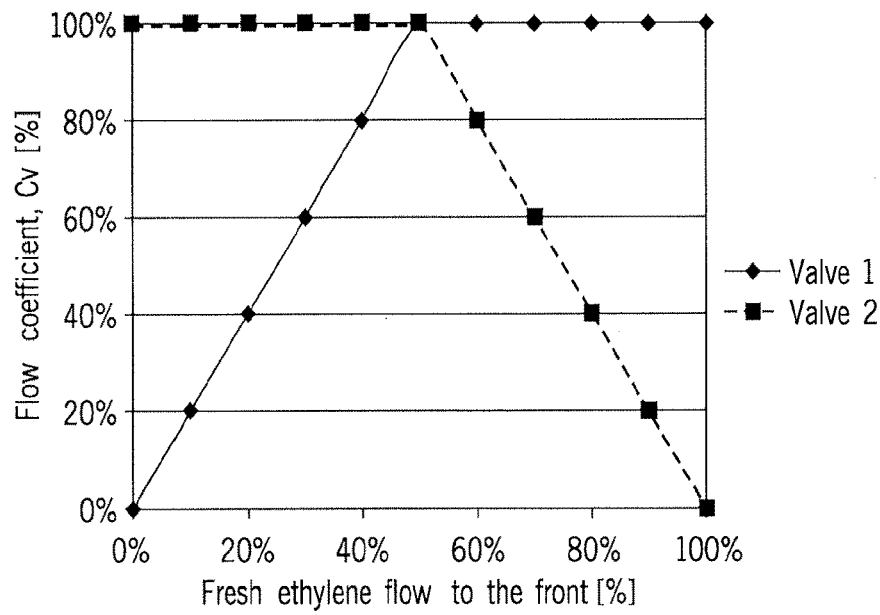
FIG. 11 is a graph that shows another control example of make-up ethylene distribution over the $1^{st}$ reaction zones.

In order to reduce the pressure drop of the flow through the valves, the second scheme has been shown in FIG. 11. In this case, the total Cv coefficient could be maximized but the pressure drop is maintained as constant level and relatively low magnitude.

Typically above types of controls can be achieved through installation of two separate control valves in line 704 and 705 or through installation of multi-way valve which has the capability to distribute the flow coming from 703 over 800 and/or 900.

In steady state operation, a given flow distribution of make-up ethylene will give a certain $Z_1/Z_i$ ratio, which determines the polymer properties. A control system can be used for a close loop control in which the flow ratio will be adjusted to obtain the target $Z_1/Z$. The $Z_1/Z_i$ ratios are calculated by using analyzer 1 and 2 as described in the FIG. 7. Alternatively, the quality measurement for example Melt strength or G' from the Analyzer 3 can be used by the control system to adjust the ethylene feed flow ratio.

TABLE 1

Influence of different ethylene feed configurations (60/40/0), (40/60/0) and (50/35/15), make-up (fresh) ethylene and CTA make-up flow to the front of the reactor on $Z_1/Z_i$ ratio.

| Case | Feed flow configuration Total ethylene | make-up C2H4 to front [%] | Cs [—] | Front feed [%] | $1^{st}$ side feed [%] | CTA make-up to front [%] | $Z_1/Z_2$ | $Z_1/Z_3$ |
|---|---|---|---|---|---|---|---|---|
| Comparative 1 (FIG. 3) | 60/40/0 | 0 | 0.33 | 60 | 40 | 60 | 1.27 | 1.27 |
| Comparative 2 (FIG. 1) | 60/40/0 | 60 | 0.33 | 60 | 40 | 60 | 1.00 | 1.00 |
| Comparative 3 (FIG. 2) | 60/40/0 | 100 | 0.33 | 60 | 40 | 60 | 0.82 | 0.82 |
| Inventive 1 (FIG. 6) | 60/40/0 | 20 | 0.33 | 60 | 40 | 60 | 1.18 | 1.18 |
| Inventive 2 (FIG. 6) | 60/40/0 | 80 | 0.33 | 60 | 40 | 60 | 0.91 | 0.91 |
| Comp. Boundary 1' (FIG. 4) | 60/40/0 | 0 | 0.33 | 60 | 40 | 100 | 1.34 | 1.34 |
| Comp. Boundary 2' (FIG. 5) | 60/40/0 | 100 | 0.33 | 60 | 40 | 0 | 0.72 | 0.72 |
| Comparative 4 (FIG. 3) | 40/60/0 | 0 | 0.33 | 40 | 60 | 40 | 1.27 | 1.27 |
| Comparative 5 (FIG. 1) | 40/60/0 | 40 | 0.33 | 40 | 60 | 40 | 1.00 | 1.00 |
| Comparative 6 (FIG. 2) | 40/60/0 | 100 | 0.33 | 40 | 60 | 40 | 0.59 | 0.59 |
| Inventive 3 (FIG. 6) | 40/60/0 | 20 | 0.33 | 40 | 60 | 40 | 1.14 | 1.14 |
| Inventive 4 (FIG. 6) | 40/60/0 | 80 | 0.33 | 40 | 60 | 40 | 0.73 | 0.73 |
| Comp. Boundary 3' (FIG. 4) | 40/60/0 | 0 | 0.33 | 40 | 60 | 100 | 1.42 | 1.42 |
| Comp. Boundary 4' (FIG. 5) | 40/60/0 | 100 | 0.33 | 40 | 60 | 0 | 0.49 | 0.49 |
| Comparative 7 (FIG. 3) | 50/35/15 | 0 | 0.33 | 50 | 35 | 50 | 1.22 | 1.27 |
| Comparative 8 (FIG. 1) | 50/35/15 | 50 | 0.33 | 50 | 35 | 50 | 1.00 | 1.00 |
| Comparative 9 (FIG. 2) | 50/35/15 | 100 | 0.33 | 50 | 35 | 50 | 0.76 | 0.73 |
| Inventive 5 (FIG. 6) | 50/35/15 | 25 | 0.33 | 50 | 35 | 50 | 1.11 | 1.14 |
| Inventive 6 (FIG. 6) | 50/35/15 | 75 | 0.33 | 50 | 35 | 50 | 0.88 | 0.86 |
| Comp. Boundary 5' (FIG. 4) | 50/35/15 | 0 | 0.33 | 50 | 35 | 100 | 0.67 | 0.63 |
| Comp. Boundary 6' (FIG. 5) | 50/35/15 | 100 | 0.33 | 50 | 35 | 0 | 1.29 | 1.37 |

All Comparative, Inventive and Comparative Boundary Examples are simulated.

TABLE 2

Influence of Different CTA Types on $Z_1/Z_i$ ratio. Note that the CTA used in Comparative 13 to 15, Inventive 9 and 10 and Comparative Boundary 9' and 10' behave as both CTA and co-monomer.

| Case | Feed flow configuration | make-up C2H4 to front [%] | Cs [—] | 1st side feed | make-up C2H4 to front | CTA make-up to front | $Z_1/Z_2$ |
|---|---|---|---|---|---|---|---|
| Comparative 10 (FIG. 3) | 40/60/0 | 0 | 0.50 | 40 | 60 | 40 | 1.26 |
| Comparative 11 (FIG. 1) | 40/60/0 | 40 | 0.50 | 40 | 60 | 40 | 1.00 |
| Comparative 12 (FIG. 2) | 40/60/0 | 100 | 0.50 | 40 | 60 | 40 | 0.61 |
| Inventive 7 (FIG. 6) | 40/60/0 | 20 | 0.50 | 40 | 60 | 40 | 1.13 |
| Inventive 8 (FIG. 6) | 40/60/0 | 80 | 0.50 | 40 | 60 | 40 | 0.74 |
| Comp. Boundary 7' (FIG. 4) | 40/60/0 | 0 | 0.50 | 40 | 60 | 100 | 1.48 |
| Comp. Boundary 8' (FIG. 5) | 40/60/0 | 100 | 0.50 | 40 | 60 | 0 | 0.46 |
| Comparative 4 (FIG. 3) | 40/60/0 | 0 | 0.33 | 40 | 60 | 40 | 1.27 |
| Comparative 5 (FIG. 1) | 40/60/0 | 40 | 0.33 | 40 | 60 | 40 | 1.00 |
| Comparative 6 (FIG. 2) | 40/60/0 | 100 | 0.33 | 40 | 60 | 40 | 0.59 |
| Inventive 3 (FIG. 6) | 40/60/0 | 20 | 0.33 | 40 | 60 | 40 | 1.14 |
| Inventive 4 (FIG. 6) | 40/60/0 | 80 | 0.33 | 40 | 60 | 40 | 0.73 |
| Comp. Boundary 3' (FIG. 4) | 40/60/0 | 0 | 0.33 | 40 | 60 | 100 | 1.42 |
| Comp. Boundary 4' (FIG. 5) | 40/60/0 | 100 | 0.33 | 40 | 60 | 0 | 0.49 |
| Comparative 13 (FIG. 3) | 40/60/0 | 0 | 0.05* | 40 | 60 | 40 | 1.26 |
| Comparative 14 (FIG. 1) | 40/60/0 | 40 | 0.05* | 40 | 60 | 40 | 1.00 |
| Comparative 15 (FIG. 2) | 40/60/0 | 100 | 0.05* | 40 | 60 | 40 | 0.61 |
| Inventive 9 (FIG. 6) | 40/60/0 | 20 | 0.05* | 40 | 60 | 40 | 1.13 |
| Inventive 10 (FIG. 6) | 40/60/0 | 80 | 0.05* | 40 | 60 | 40 | 0.74 |
| Comp. Boundary 9' (FIG. 4) | 40/60/0 | 0 | 0.05* | 40 | 60 | 100 | 1.48 |
| Comp. Boundary 10' (FIG. 5) | 40/60/0 | 100 | 0.05* | 40 | 60 | 0 | 0.46 |
| Comparative 16 (FIG. 3) | 40/60/0 | 0 | 0.02 | 40 | 60 | 40 | 1.34 |
| Comparative 17 (FIG. 1) | 40/60/0 | 40 | 0.02 | 40 | 60 | 40 | 1.00 |
| Comparative 18 (FIG. 2) | 40/60/0 | 100 | 0.02 | 40 | 60 | 40 | 0.53 |
| Inventive 11 (FIG. 6) | 40/60/0 | 20 | 0.02 | 40 | 60 | 40 | 1.17 |
| Inventive 12 (FIG. 6) | 40/60/0 | 80 | 0.02 | 40 | 60 | 40 | 0.68 |
| Comp. Boundary 11' (FIG. 4) | 40/60/0 | 0 | 0.02 | 40 | 60 | 100 | 1.35 |
| Comp. Boundary 12' (FIG. 5) | 40/60/0 | 100 | 0.02 | 40 | 60 | 0 | 0.52 |

All Comparative, Inventive and Comparative Boundary Examples are simulated.

TABLE 3

Influence of Ethylene Conversion on Z1/Zi Ratio (Reactor Configuration 40/60/0)

| Ethylene conversion [%] | Case | Feed flow configuration | make-up C2H4 to front [%] | Cs [—] | Front feed [%] | 1st side feed [%] | CTA make-up to front [%] | Z1/Z2 |
|---|---|---|---|---|---|---|---|---|
| 20% | Comparative 19 (FIG. 3) | 40/60/0 | 0 | 0.33 | 40 | 60 | 40 | 1.17 |
|  | Comparative 20 (FIG. 1) | 40/60/0 | 60 | 0.33 | 40 | 60 | 40 | 1.00 |
|  | Comparative 21 (FIG. 2) | 40/60/0 | 100 | 0.33 | 40 | 60 | 40 | 0.74 |
|  | Inventive 13 (FIG. 6) | 40/60/0 | 20 | 0.33 | 40 | 60 | 40 | 1.08 |
|  | Inventive 14 (FIG. 6) | 40/60/0 | 80 | 0.33 | 40 | 60 | 40 | 0.83 |
|  | Comp. Boundary 13' (FIG. 4) | 40/60/0 | 0 | 0.33 | 40 | 60 | 100 | 1.27 |
|  | Comp. Boundary 14' (FIG. 5) | 40/60/0 | 100 | 0.33 | 40 | 60 | 0 | 0.64 |
| 30% | Comparative 4 (FIG. 3) | 40/60/0 | 0 | 0.33 | 40 | 60 | 40 | 1.27 |
|  | Comparative 5 (FIG. 1) | 40/60/0 | 40 | 0.33 | 40 | 60 | 40 | 1.00 |
|  | Comparative 6 (FIG. 2) | 40/60/0 | 100 | 0.33 | 40 | 60 | 40 | 0.59 |
|  | Inventive 3 (FIG. 6) | 40/60/0 | 20 | 0.33 | 40 | 60 | 40 | 1.14 |
|  | Inventive 4 (FIG. 6) | 40/60/0 | 80 | 0.33 | 40 | 60 | 40 | 0.73 |
|  | Comp. Boundary 3' (FIG. 4) | 40/60/0 | 0 | 0.33 | 40 | 60 | 100 | 1.42 |
|  | Comp. Boundary 4' (FIG. 5) | 40/60/0 | 100 | 0.33 | 40 | 60 | 0 | 0.49 |
| 40% | Comparative 22 (FIG. 3) | 40/60/0 | 0 | 0.33 | 40 | 60 | 40 | 1.39 |
|  | Comparative 23 (FIG. 1) | 40/60/0 | 40 | 0.33 | 40 | 60 | 40 | 1.00 |
|  | Comparative 24 (FIG. 2) | 40/60/0 | 80 | 0.33 | 40 | 60 | 40 | 0.61 |
|  | Inventive 15 (FIG. 6) | 40/60/0 | 20 | 0.33 | 40 | 60 | 40 | 1.20 |
|  | Inventive 16 (FIG. 6) | 40/60/0 | 60 | 0.33 | 40 | 60 | 40 | 0.79 |
|  | Comp. Boundary 15' (FIG. 4) | 40/60/0 | 0 | 0.33 | 40 | 60 | 100 | 1.59 |
|  | Comp. Boundary 16' (FIG. 5) | 40/60/0 | 80 | 0.33 | 40 | 60 | 0 | 0.48 |

All Comparative, Inventive and Comparative Boundary Examples are simulated.

Actual Polymerizations (Comparative Boundary Polymerizations)

TABLE 4

Initiators Comparative Boundary Examples 17'-18'

| Initiator | Abbreviation | Used in Rx-zone 1/2/3 |
|---|---|---|
| tert-Butyl peroxy-2-ethyl hexanoate | TBPO | yes/yes/no |
| Di-tert-butyl peroxide | DTBP | yes/yes/yes |

TABLE 5

Pressure and Temperature Conditions of Comparative Boundary Examples 17'-18' (Actual Polymers)

| Case | Inlet pressure/bar | Start temp/° C. | Reinitiation temp/° C. | Reinitiation temp/° C. | 1st Peak temp/° C. | 2nd Peak temp/° C. | 3rd Peak temp/° C. |
|---|---|---|---|---|---|---|---|
| Comp. Boundary 17' | 2150 | 145 | 152 | 196 | 293 | 293 | 293 |
| Comp. Boundary 18' | 2140 | 145 | 159 | 197 | 292 | 294 | 294 |

TABLE 6

Additional information of the Comparative Boundary Examples 17'-18' (Actual Polymers)

| Case | CTA | Ratio CTA concentration 1st Rx-zone/last Rx-zone (Z1/Zi) | Total Hyper throughput Ton/hr | Polymer output Ton/hr |
|---|---|---|---|---|
| Comp. Boundary 17' | PA | 1.37 | 56.4 | 15.9 |
| Comp. Boundary 18' | PA | 0.71 | 56.1 | 15.8 |

TABLE 7

Polymer Properties of Comparative Boundary Examples 17' and 18' (Actual Polymers)

| Case | Melt index g/dmin | Density (quick) g/cc | G' (G" = 500 Pa, 170 C.) Pa | Melt elasticity cN | Mn g/mol | Mw g/mol |
|---|---|---|---|---|---|---|
| Comp. Boundary 17' | 4.36 | 0.9246 | 67 | 1.24 | 14 900 | 71 700 |
| Comp. Boundary 18' | 4.14 | 0.9239 | 99 | 2.23 | 13 800 | 79 800 |

Description of Now Diagram Used for Comparative Boundary Example 17' (Actual Polymerization)

Figure 12:
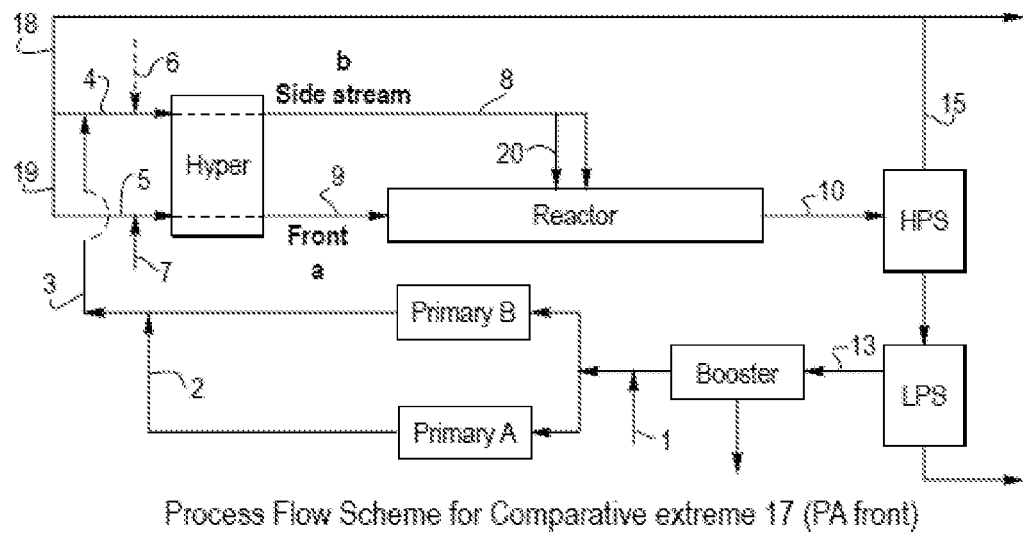
FIG. 12 is the process flow sheet for comparative extreme 17 (PA front) of actual polymerization.

FIG. 12 shows the flow scheme of the high pressure polymerization process with a tubular reactor, used to produce Comparative Example 17. Stream (1), ethylene make-up, is compressed together with the outlet of the Booster by Primary compressor system resulting in flow (3). Stream (3) is fed together with additional ethylene from the high pressure recycle stream (19) through line 5 to the Hyper compressor part feeding the side (8) of the Reactor. The hyper compressor part feeding the front stream (9) receives ethylene feed through line (19) and (5) from the high pressure recycle stream (19). Line (6) and Line (7) depict each separate line for feeding separately CTA and branching agent to respectively line (4) and line (5). Information about the Reactor system can be found below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated step.

Description of Flow Diagram Used for Comparative Boundary Example 18' (Actual Polymerization)

Figure 13:
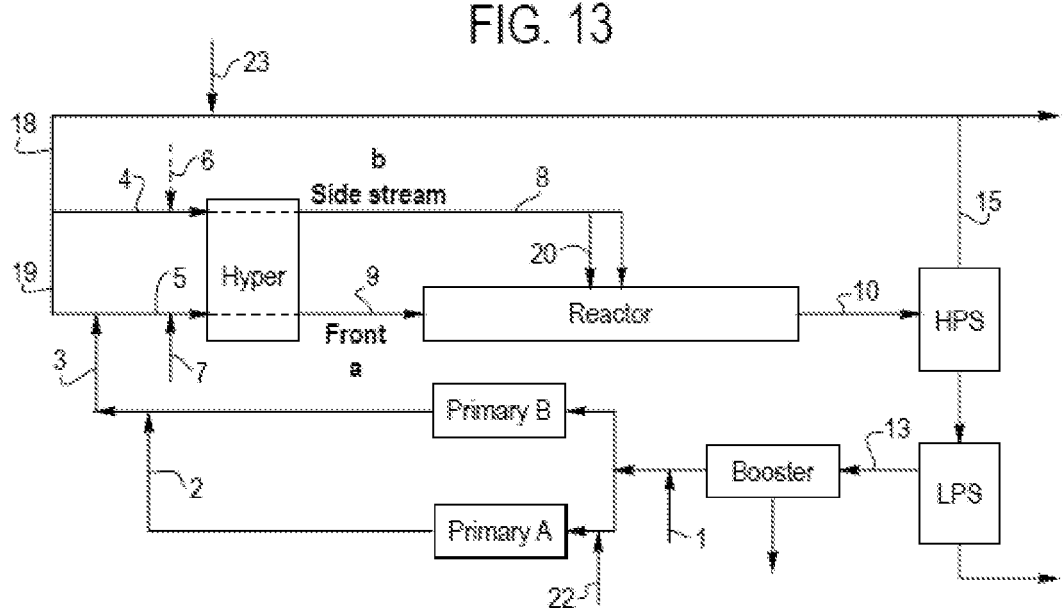
FIG. 13 is the process flow sheet for comparative extreme 18 (PA side) of actual polymerization.

FIG. 13 shows the flow scheme of the high pressure polymerization process with a tubular reactor, used to produce Comparative Example 18. Stream (1), ethylene make-up, is compressed together with the outlet of the booster by primary compressor system resulting in flow (3). Stream (2) is combined with high pressure recycle stream (19) and fed through line 5 to the hyper compressor part feeding the front (9) of the Reactor. The hyper compressor part feeding the side stream (8) receives ethylene feed through line (4). Line (4) receives ethylene feed from line (18). The CTA is fed through line (23). Line 22 is an optional line to feed a CTA component, but was not used in this example. The hyper pressurizes the ethylene feed streams to a level sufficient to feed the high pressure tubular reactor (Reactor).

Stream (6) and/or stream (7) depict the polyene feed. Information about the reactor system can be found below. In the reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated procedures.

Comparative Boundary Example 17' (Comparative Boundary Ethylene-based Polymer made with PA) (Actual Polymerization)

The polymerization was carried out in tubular reactor with three reaction zones (See FIG. 12). The non-converted ethylene, and other gaseous components in the reactor outlet, were recycled through the high pressure recycle and low pressure recycle, and were compressed and distributed through the booster, primary and hyper (secondary) compressor systems, according to the flow scheme as shown in FIG. 12. This configuration leads to the highest ratios of CTA concentration ($Z_1/Z_3=1.37$) in the front ethylene-based feed versus the concentrations of CTA in sequential ethylene-based feed streams (as explained in previous sections).

In each reaction zone, the polymerization was initiated with organic peroxides as described in Table 4. After reaching the first peak temperature in reaction zone 1, the reaction medium was cooled down with pressurized water. At the outlet of the first reaction zone, the reaction medium was further cooled by injecting a cold ethylene-rich feed stream, and the reaction was initiated again, by feeding an organic peroxide system into the reaction zone. This process was repeated at the end of the second reaction zone, to enable further polymerization in the third reaction zone.

The weight ratio of the ethylene-rich feed streams to the three reaction zones was 1.00:0.60:0.40. For the chain transfer agent, propionaldehyde (PA) was used, and it was present in each reactor inlet, originating from the low and high pressure recycle flows (#13 and #15), as well as from injected CTA make-up stream 6 and 7. The make-up ethylene is fed through stream #1.

Comparative Boundary 18' (Comparative Boundary Ethylene-based Polymer made with PA) (Actual Polymerization)

The polymerization was carried out in tubular reactor with three reaction zones (See FIG. 13). The non-converted ethylene, and other gaseous components in the reactor outlet, were recycled through the high pressure recycle and low pressure recycle, and were compressed and distributed through the booster, primary and hyper (secondary) compressor systems, according to the flow scheme as shown in FIG. 13. This configuration leads to the lowest ratios of CTA concentration ($Z_1/Z_3=0.61$) in the front ethylene-based feed versus the concentrations of CTA in sequential ethylene-based feed streams.

In each reaction zone, the polymerization was initiated with organic peroxides as described in Table 4. After reaching the first peak temperature in reaction zone 1, the reaction medium was cooled down with pressurized water. At the outlet of the first reaction zone, the reaction medium was further cooled by injecting a cold ethylene-rich feed stream (#20), and the reaction was initiated again, by feeding an organic peroxide system into the reaction zone. This process was repeated at the end of the second reaction zone, to enable further polymerization in the third reaction zone.

The weight ratio of the ethylene-rich feed streams to the three reaction zones was 1.00:0.60:0.40. For the chain transfer agent, propionaldehyde (PA) was used, and it was present in each reactor inlet, originating from the low and high pressure recycle flows (#13 and #15), as well as from injected CTA make-up stream #23. The make-up ethylene is fed through stream #1.

The actual $Z_1/Z_3$ ratios calculated from actual polymers (comparative extreme 17 and 18) are much close to the ratios calculated from the mass balance model with the same reactor configuration (See comparative extreme cases 5 and 6 in Table 1. A slight difference between the comparative extreme 6 (calculation) and comparative extreme 18 (actual) where the $Z_1/Z_3$ are 0.63 and 0.71, respectively, is found. It could be due to the different Melt Index applied between the calculation and the plant operation.

Figure 14:
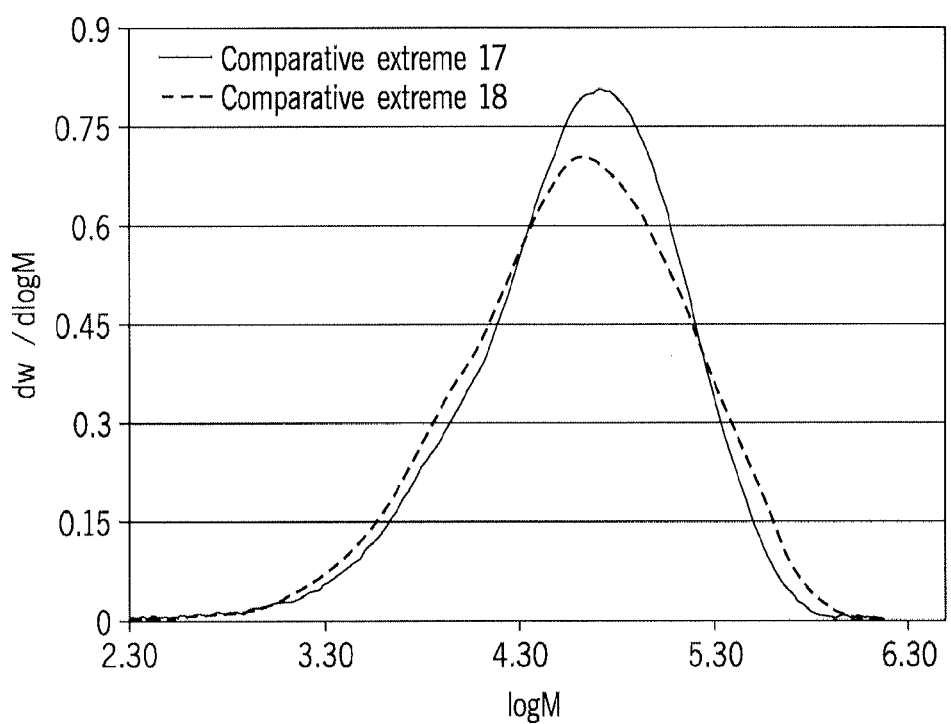
FIG. 14 is a graph that shows MWD curves using conventional GPC methods.

Finally, the molecular weight distribution (MWD) curves from conventional GPC measurements have been done for the comparative extreme 17 and 18 and shown in FIG. 14. In addition, the Mw and Mn of the produced polymers have also been shown in Table 7. It is clearly illustrated the very narrow polymer properties (comparative extreme 17) and very broad MWD in comparative extreme 18 operation corresponding to the $Z_1/Z_i$ of 1.37 and 0.71 respectively. Those experimental data have proven the concept studied in this invention.

Summary of Results

The results in invention show the possibility to stepless control MWD of produced polymers via the flexibility control of make-up ethylene distribution to the front ($1^{st}$ reaction zone) of a tubular reactor. The make-up ethylene distribution over the reaction zones can be done via a control device with a control valve system. By this application, the $Z_1/Z_3$ ratio could be below or higher than 1 for broad or narrow MWD respectively, thus the MWD could be stepless controlled without any effect on other operating conditions such as reactor inlet pressure or temperature. Moreover, the influence of the reactor configurations, CTAs type (Cs value) as well as ethylene conversion levels has fully been described. Interestingly it is found that there is almost no additional impact on $Z_1/Z_i$ by the distribution of make-up CTA when CTAs with very low Cs values are applied. In contrast the effect on $Z_1/Z_i$ is significantly enlarged when CTAs with higher Cs values are used. Also a CTA that behaves additionally as a comonomer will enlarge the impact of CTA make up distribution on $Z_1/Z_i$.

The polymers made in a plant at extreme $Z_1/Z_i$ ratios were used to demonstrate the impact of the $Z_1/Z_i$ ratio on measured MWD and other rheological properties. For instance (i) all PA to the front, combined with all make-up ethylene to the side, give low Melt Elasticity indicating very narrow MWD (as measured from GPC technique) and (ii) all PA sent to the side, combined with all make-up ethylene to the front, results in very high Melt Elasticity indicating very broad MWD. The invention allows operating step-less between the extremes in product properties, thus making the process efficient and its product capability flexible and versatile.

The invention claimed is:

1. A high pressure polymerization process to form an ethylene-based polymer, the process comprising at least the following step:
   polymerizing a reaction mixture comprising ethylene, using a reactor configuration comprising (A) at least two reaction zones, a first reaction zone (reaction zone 1) and an i reaction zone (reaction zone i where i≥2), (B) at least two ethylene feed streams, each feed stream comprising a percentage of the total make-up ethylene fed to the polymerization process, in which a first ethylene feed stream is sent to reaction zone 1 and a second ethylene feed stream is sent to reaction zone i, and (C) a control system to control the percentage of the total make-up ethylene in the ethylene feed stream sent to reaction zone 1 and the percentage of the total make-up ethylene in the ethylene feed stream sent to reaction zone i,
   wherein the reactor configuration further comprises at least one analyzer for detecting a component of a stream of the reactor configuration or determining a property of the ethylene-based polymer produced by the high pressure polymerization process,
   wherein the analyzer and a valve of the control system are connected through a feedback loop.

2. The process of claim 1, wherein the control system comprises a valve on a line through which an ethylene feed stream is delivered to a reaction zone.

3. The process of claim 2, wherein the valve is a three-port valve.

4. The process of claim 1, wherein the analyzer is at least one of a gas chromatograph or an infrared spectrometer.

5. The process of claim 1, wherein the measured property of the ethylene-based polymer is at least one of a rheological property or an optical property.

6. The process of claim 5, wherein the rheological property is at least one of melt strength and melt elasticity.

7. The process of claim 1, wherein the percentage of make-up ethylene in each of the first and second ethylene feed streams is from 1 to 99%.

8. The process of claim 1, wherein each of the first and second ethylene feed streams further comprises a percentage of the total of at least one CTA make-up system fed to the high pressure polymerization process.

9. The process of claim 1, wherein Z1 is a ratio of moles of CTA to moles of ethylene in reaction zone 1 and Zi is a ratio of moles of CTA to moles of ethylene in reaction zone i, Z1 and Zi reported in units of parts per million (ppm).

10. The process of claim 9, wherein a ratio Z1/Zi is controlled to be from 0.2 to 2.0.

* * * * *